(12) United States Patent
Takenaka

(10) Patent No.: US 9,091,304 B2
(45) Date of Patent: Jul. 28, 2015

(54) TORSIONAL VIBRATION ATTENUATION APPARATUS

(75) Inventor: Tetsuhiro Takenaka, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/981,429

(22) PCT Filed: Feb. 4, 2011

(86) PCT No.: PCT/JP2011/000640
§ 371 (c)(1),
(2), (4) Date: Jul. 24, 2013

(87) PCT Pub. No.: WO2012/104926
PCT Pub. Date: Aug. 9, 2012

(65) Prior Publication Data
US 2013/0310184 A1 Nov. 21, 2013

(51) Int. Cl.
F16F 15/129 (2006.01)
F16D 3/12 (2006.01)
F16F 15/123 (2006.01)

(52) U.S. Cl.
CPC .............. *F16D 3/12* (2013.01); *F16F 15/129* (2013.01); *F16F 15/12333* (2013.01)
USPC ...................................... 464/68.4

(58) Field of Classification Search
USPC .................. 464/68.4, 68.41; 192/210, 210.1, 192/213.11, 213.12, 213.21, 213.22, 213.3, 192/213.31, 214, 214.1
See application file for complete search history.

(56) References Cited

U.S. PATENT DOCUMENTS

| 2,826,902 A * | 3/1958 | De Coursey ............... 464/68.41 |
| 3,266,271 A * | 8/1966 | Stromberg ........... 192/213.22 X |
| 3,809,198 A * | 5/1974 | Mori ........................... 192/210.1 |
| 4,274,525 A * | 6/1981 | Raab et al. ............... 192/213.31 |
| 2002/0039925 A1 | 4/2002 | Uehara |
| 2006/0102444 A1 | 5/2006 | Kitada |
| 2010/0051411 A1 | 3/2010 | Saeki et al. |

FOREIGN PATENT DOCUMENTS

| DE | 2610081 A1 | 9/1977 |
| EP | 1521012 A1 | 4/2005 |
| GB | 2042680 A | 9/1980 |
| GB | 2156040 A | 10/1985 |
| JP | 5-045259 U | 6/1993 |
| JP | 2002-106640 A | 4/2002 |
| JP | 2003-074636 A | 3/2003 |
| JP | 2006-144861 A | 6/2006 |
| JP | 2010-053922 A | 3/2010 |
| JP | 2010-203558 A | 9/2010 |

* cited by examiner

*Primary Examiner* — Gregory Binda
(74) *Attorney, Agent, or Firm* — Sughrue Mion, PLLC

(57) ABSTRACT

A torsional vibration damping device is configured to have hysteresis torques in the positive and negative sides varied by a simple construction, thereby improving the efficiency of production work and preventing an increase in production cost. Friction materials are respectively provided on surfaces of a hub member and the disc plates, the surfaces facing each other in the radial direction when the hub member is twisted in the positive side with respect to the disc plates. The friction materials are to be brought into friction contact with each other when the hub member is twisted by a specific angle with respect to the disc plates.

10 Claims, 16 Drawing Sheets

TORSIONAL VIBRATION ATTENUATION APPARATUS

CROSS REFERENCE TO RELATED APPLICATIONS

This application is a National Stage of International Application No. PCT/JP2011/000640 filed Feb. 4, 2011, the contents of all of which are incorporated herein by reference in their entirety.

TECHNICAL FIELD

The present invention relates to a torsional vibration attenuation apparatus, and more particularly to a torsional vibration attenuation apparatus which comprises a first rotation member and a second rotation member intervening between an internal combustion engine and a drive train, in which the first rotation member and the second rotation member are relatively rotatably connected with each other through a resilient member, so that a rotational torque is transmitted between the first rotation member and the second rotation member.

BACKGROUND ART

There has so far been known a drive source such as an internal combustion engine, an electric motor and the like drivably connected with wheels through a drive train including a transmission and the like, so that a driving power from the drive source can be transmitted to the wheels through the drive train. This type of a vehicle, however, encounters such a problem that muffled noises or chinking noises are generated by torsional vibrations originated from rotational fluctuations caused for example by torque fluctuations of an internal combustion engine.

Here, the term "chinking noises" is one kind of abnormal noises which sounds "jarajara" caused by collisions of an idling gear pair forming part of a set of transmission gears. The collisions are in general caused by torsional vibrations originated from the rotational fluctuations caused by the torque fluctuations of the internal combustion engine. On the other hand, the term "muffled noises" is also one kind of abnormal noises which is generated in a passenger room due to vibrations caused by the torsional resonance of the drive train originated from the torque fluctuations of the internal combustion engine. The torsional resonance of the drive train is usually generated in the normal area (for example around 2500 rpm of the rotational speed of the internal combustion engine for an FF vehicle) at a low vehicle speed.

For this reason, between the internal combustion engine and the drive train is provided a torsional vibration attenuation apparatus which can absorb the rotational fluctuations of the internal combustion engine, thereby making it possible to concurrently absorb the torsional vibrations of the drive train.

One of the conventional torsional vibration attenuation apparatuses comprises a first rotation member selectively connected with or released from a flywheel, a second rotation member connected with an input shaft extending from a transmission, and coil springs disposed between the first and the second rotation members to have the first and the second rotation members resiliently connected with each other in a rotation direction (for example see Patent Document 1).

The first rotation member is constituted by a clutch disc made of a friction material, and a pair of disc plates connected with the radially inner side of the clutch disc. The second rotation member is, on the other hand, constituted by a hub member which is constituted by a boss splined to the outer peripheral portion of the input shaft extending from the transmission, and a flange radially outwardly extending from the boss.

The coil springs are respectively accommodated in and supported by a plurality of spring accommodation windows formed in the flange, and a plurality of spring accommodation portions formed in the pair of disc plates in opposing relationship with the spring accommodation windows.

The coil springs thus constructed and arranged can be compressed between a pair of input plates, i.e., disc plates and the hub member in the circumferential direction to the input plates when the pair of disc plates and the hub member are relatively rotated. The circumferential torsional vibrations inputted from the pair of disc plates to the hub member can be absorbed by the coil spring, thereby making it possible to suppress the chinking noises from being generated.

On the other hand, between the hub member and the pair of disc plates is provided a hysteresis mechanism constituted by a thrust member which serves to generate a hysteresis torque based on a friction force between the hub member and the pair of disc plates, thereby making it possible to suppress the torsional resonance of the driving train and to reduce the muffled noises remarkably generated in the passenger room at the low speed of the vehicle.

It is known that the rotational fluctuation properties of the internal combustion engine are different between an acceleration time and a deceleration time of the vehicle, the acceleration time being a time when the hub member is relatively rotated in the positive side with respect to the pair of disc plates by the rotational torque of the internal combustion engine transmitted from the pair of disc plates to the hub member, and the deceleration time being a time when the hub member is relatively rotated in the negative side with respect to the pair of disc plates by the rotational torque of the internal combustion engine transmitted from the hub member to the pair of disc plates by the engine brake.

FIG. 10 is a view showing rotational fluctuations at the acceleration time and at the deceleration time. As shown in FIG. 10, the rotational fluctuations at the acceleration time are large in the low rotational speed area of the internal combustion engine, while the rotational fluctuations at the deceleration time are large in the high rotational speed area of the internal combustion engine.

For this reason, it is necessary that the hysteresis torque of a damper mechanism be heightened around the torsional resonance point at the acceleration time to suppress the torsional resonance of the drive train in the low rotational speed area, while the hysteresis torque of the damper mechanism be reduced to a smaller level around the high rotational speed area of the internal combustion engine with the large rotational fluctuations at the deceleration time to suppress the torsional vibrations by increasing the damping force.

The conventional damper mechanism is, however, constructed to have hysteresis torques at the acceleration time and at the deceleration time set at the same level, so that a damping mechanism can attenuate the torsional resonance of the drive train in the low rotational speed area at the acceleration time for the large hysteresis torque, but there is a possibility that the damping mechanism cannot sufficiently attenuate the torsional vibrations at the deceleration time.

For the hysteresis torque reduced to absorb the torsional vibrations at the deceleration time, the torsional vibrations are increased by the torsional resonance of the drive train around the resonance point at the acceleration time (shown by a dashed line in FIG. 11), thereby leading to generating the muffled noises.

In view of the above facts, there has so far been provided another vibration attenuation apparatus as one of conventional apparatuses which is constructed to have the hysteresis torques changed and different from each other at the acceleration time and at the deceleration time. The vibration attenuation apparatus comprises a friction generation mechanism for generating friction between the pair of disc plates and the hub member when the disc plates and the hub member are relatively rotated with respect to each other. The friction generation mechanism comprises a first friction generation portion and a second friction generation portion, the first friction generation portion functioning to generate frictions between the pair of disc plates and the hub member in the torsional property positive and negative sides while the second friction generation portion having a float member to be engaged with the hub member in the torsional property positive side to operate the first friction generation portion, and to be disengaged from the hub member in the torsional property negative side to prevent the first friction generation portion from being operated (for example see Patent Document 2).

The vibration attenuation apparatus thus constructed can suppress the torsional resonance by heightening the hysteresis torque at the acceleration time, while can increase the damping force by reducing the hysteresis torque at the deceleration time.

CITATION LIST

Patent Literature

Patent Document 1: Japanese Patent Application Publication No. 2006-144861
Patent Document 2: Japanese Patent Application Publication No. 2002-106640

SUMMARY OF INVENTION

Technical Problem

The conventional torsional vibration attenuation apparatus as previously mentioned, however, comprises a friction generation mechanism having a first friction generation portion and a second friction generation portion. The first friction generation portion is disposed between the pair of disc plates and the hub member to be operated when the pair of disc plates are engaged with the hub member in the torsional property positive side, while the second friction generation portion has a float member functioning to prevent the first friction generation portion from being operated with the disc plates being disengaged from the hub member in the torsional property negative side.

For this reason, the conventional torsional vibration attenuation apparatus encounters such a problem that the second friction generation portion is complicated in construction and thus needs laborious works in the process of producing the torsional vibration attenuation apparatus, thereby leading to the increase in the production cost of the torsional vibration attenuation apparatus.

It is therefore an object of the present invention to provide a torsional vibration attenuation apparatus which can be made simple in construction and can make variable the hysteresis torques in the positive and negative sides by the simple construction, thereby making it possible to improve the workability of production works and to prevent the production cost from being increased.

Solution to Problem

To achieve the above object, the torsional vibration attenuation apparatus according to the present invention comprises a first rotation member, a second rotation member provided to be relatively rotatable with respect to the first rotation member, a resilient member provided between the first rotation member and the second rotation member and resiliently deformable between the first rotation member and the second rotation member in response to the relative rotation of the second rotation member with respect to the first rotation member in a positive side and a negative side, and a hysteresis mechanism having the first rotation member and the second rotation member frictionally contacted with each other, the first rotation member and the second rotation member respectively having facing surfaces facing each other in response to the relative rotation of the second rotation member with respect to the first rotation member in the positive side, the hysteresis mechanism having friction contact members respectively provided on the facing surfaces of the first rotation member and the second rotation member.

The torsional vibration attenuation apparatus is constructed to have the hysteresis mechanism having friction contact members on the facing surfaces of the first rotation member and the second rotation member facing each other in response to the relative rotation of the second rotation member with respect to the first rotation member in the positive side.

The torsional vibration attenuation apparatus thus constructed can make the positive side hysteresis torque larger than the negative side hysteresis torque. The torsional vibration attenuation apparatus intervening between the internal combustion engine and the drive train having a transmission can therefore suppress the torsional vibrations at the time of passing the torsional resonance point at the acceleration time of the vehicle when the second rotation member is twisted in the positive side with respect to the first rotation member.

Further, the torsional vibration attenuation apparatus can attenuate the torsional vibrations by increasing the damping force at the deceleration time of the vehicle when the second rotation member is twisted in the negative side with respect to the first rotation member.

The torsional vibration attenuation apparatus according to the present invention can be made simple in construction only with the friction contact members merely added to be frictionally contactable with each other when the second rotation member is twisted in the positive side with respect to the first rotation member, thereby making it possible to allow the hysteresis torque to be variable in the positive side (at the acceleration time) and the negative side (at the deceleration time), so that not only the production workability of the torsional vibration attenuation apparatus can be improved, but also the production cost of the torsional vibration attenuation apparatus can be prevented from being increased.

The torsional vibration attenuation apparatus may preferably be so constructed that the friction contact members are provided within an angular range in which the second rotation member is relatively rotatable by a predetermined angle in the positive side with respect to the first rotation member.

The torsional vibration attenuation apparatus according to the present invention can increase the hysteresis torque to a desired level when the second rotation member is relatively rotated in the positive side with respect to the first rotation member until the torsion angle between the first rotation member and the second rotation member reaches a desired torsion angle.

As a result, the torsional vibration attenuation apparatus according to the present invention can reduce the hysteresis torque to sufficiently attenuate the small torsional vibrations in the rotation area of the internal combustion engine with the reduced rotation fluctuation of the internal combustion engine when the second rotation member is relatively rotated in the positive side with respect to the first rotation member, and can increase the hysteresis torque in the rotation area of the internal combustion engine where the torsional resonance is generated, thereby making it possible to suppress the chinking noises and the muffled noises caused by the torsional resonance.

Further, the magnitude of the hysteresis torque generated when the second rotation member is relatively rotated in the positive side with respect to the first rotation member can freely be set in response to the torsion angle between the first rotation member and the second rotation member, thereby making it possible to improve the degree of freedom for setting the hysteresis torque.

The torsional vibration attenuation apparatus may preferably be so constructed that the friction contact members are provided on the facing surfaces of the first rotation member and the second rotation member, the facing surfaces radially facing each other.

The torsional vibration attenuation apparatus according to the present invention can be made simple in construction only with the friction contact members provided on the radially facing surfaces of the first rotation member and the second rotation member, thereby making it possible to make the positive side hysteresis torque larger than the negative side hysteresis torque, so that the torsional vibration attenuation apparatus can be prevented from being complicated in construction, and the production cost of the torsional vibration attenuation apparatus can be prevented from being increased.

The torsional vibration attenuation apparatus may preferably be so constructed that the friction contact members are constructed to include a guide member, a first friction material, and a second friction material, the guide member being provided on the first rotation member to have a curved surface identical in shape to the rotation path of the radially outer end of the second rotation member and to extend in the circumferential direction of the first rotation member, the first friction material being provided on the guide member, the second friction material being provided on the second rotation member to be positioned radially inwardly of the guide member to be frictionally contactable with the first friction material in response to the relative rotation of the second rotation member with respect to the first rotation member in the positive side.

The torsional vibration attenuation apparatus according to the present invention can be made simple in construction only with the first friction material, the second friction material, and the guide member provided on the first rotation member and the second rotation member, thereby making it possible to make the positive side hysteresis torque larger than the negative side hysteresis torque.

The torsional vibration attenuation apparatus according to the present invention has the first friction material provided on the guide member having a curved surface identical in shape to the rotation path of the radially outer end of the second rotation member and extending in the circumferential direction of the first rotation member, so that the first friction material can frictionally be contacted with the second friction material without fail when the second rotation member is relatively rotated in the positive side with respect to the first rotation member, thereby making it possible to allow the hysteresis torque in the positive side to be larger than the hysteresis torque in the negative side.

The torsional vibration attenuation apparatus may preferably be so constructed that the friction contact members are provided on the facing surfaces of the first rotation member and the second rotation member, the facing surfaces axially facing each other.

The torsional vibration attenuation apparatus according to the present invention can be made simple in construction only with the friction contact members provided on the facing surfaces of the first rotation member and the second rotation member axially facing each other, thereby making it possible to make the positive side hysteresis torque larger than the negative side hysteresis torque. The torsional vibration attenuation apparatus according to the present invention can be prevented from being complicated in construction, and the production cost of the torsional vibration attenuation apparatus can be prevented from being increased.

The torsional vibration attenuation apparatus may preferably be so constructed that the friction contact members are constructed to include the first friction material, and the second friction material, the first friction material being provided on the first rotation member to extend by a predetermined length in the circumferential direction of the first rotation member, and the second friction material frictionally contactable with the first friction material in response to the relative rotation of the second rotation member with respect to the first rotation member in the positive side.

The torsional vibration attenuation apparatus according to the present invention can be made simple in construction only with the first friction material and the second friction material provided on the first rotation member and the second rotation member, respectively, thereby making it possible to make the positive side hysteresis torque larger than the negative side hysteresis torque.

The torsional vibration attenuation apparatus may preferably be so constructed that the hysteresis mechanism has hysteresis torque generation members provided to extend in the circumferential direction of the first rotation member and the second rotation member to have the first rotation member and the second rotation member frictionally contactable with each other, and each of the friction contact members is set to have a contact resistance with the hysteresis torque generated in response to the relative rotation of the first rotation member in the positive side with respect to the second rotation member being larger than the hysteresis torque generated in response to the relative rotation of the second rotation member in the positive side with respect to the first rotation member.

The torsional vibration attenuation apparatus according to the present invention preferably has hysteresis torque generation members provided to extend in the circumferential direction of the first rotation member and the second rotation member to have the first rotation member and the second rotation member frictionally contactable with each other, thereby making it possible to generate the magnitudes of the hysteresis torques identical to each other when the friction contact members are out of contact with each other.

In addition, the contact resistance of the friction contact members is set to have the hysteresis torque generated when the second rotation member is twisted in the positive side with respect to the first rotation member, the magnitude of the hysteresis torque being larger than that of the hysteresis torque generated when the second rotation member is relatively rotated in the negative side with respect to the first rotation member, so that only the friction contact members are merely added to the conventional torsional vibration attenuation apparatus having the hysteresis torque generation member, thereby making it possible to allow the positive side hysteresis torque to be larger than the negative side hysteresis torque by the simple construction with only the friction contact members merely added to the conventional torsional vibration attenuation apparatus.

The torsional vibration attenuation apparatus may preferably be so constructed to be mounted on a vehicle, and so constructed that the first rotation member is transmitted with the rotational torque from an internal combustion engine, and the second rotation member is mounted on a vehicle to output the rotational torque to a drive train, the second rotation member being twisted in the positive side with respect to the first rotation member at the acceleration time of the vehicle, while the second rotation member being twisted in the negative side with respect to the first rotation member at the deceleration time of the vehicle.

The torsional vibration attenuation apparatus according to the present invention can have the second rotation member twisted in the positive side with respect to the first rotation member at the acceleration time of the vehicle, while having the second rotation member twisted in the negative side with respect to the first rotation member at the deceleration time of the vehicle, so that the torsional vibrations can be suppressed when the rotational speed of the internal combustion engine passes the torsional resonance point at the acceleration time of the vehicle, thereby making it possible to suppress the chinking noises and the muffled noises from being generated, and to increase the damping force to sufficiently attenuate the torsional vibrations at the deceleration time of the vehicle.

The torsional vibration attenuation apparatus may preferably be so constructed that the second rotation member is constituted to include a boss connected with an input shaft forming part of the drive train, and a hub member having a flange radially outwardly projecting from the boss, the first rotation member is constituted to include disc plates provided at the both axial sides of the hub member to be transmitted with a power from the internal combustion engine, and the friction contact members are provided on the facing surfaces of the flange and the disc plates to be frictionally contactable with each other in response to the relative rotation of the hub member in the positive side with respect to the disc plates.

The torsional vibration attenuation apparatus according to the present invention can be made simple in construction only with the friction contact members respectively provided on the facing surfaces of the flange and the disc plates, the facing surfaces facing each other when the hub member is twisted in the positive side with respect to the disc plates, thereby making it possible to make variable the hysteresis torque in the positive side (at the acceleration time) and the hysteresis torque in the negative side (at the deceleration time), so that not only the workability of the production work for the torsional vibration attenuation apparatus can be improved, but also the production cost of the torsional vibration attenuation apparatus can be prevented from being increased.

Advantageous Effects of Invention

The torsional vibration attenuation apparatus according to the present invention can be made simple in construction, and can make variable the positive side and the negative side hysteresis torques by the simple construction, and thereby can improve the workability of the production work for the torsional vibration attenuation apparatus, and can prevent the production cost of the torsional vibration attenuation apparatus from being increased.

DESCRIPTION OF EMBODIMENTS

The preferred embodiments of the torsional vibration attenuation apparatus according to the present invention will be described hereinafter with reference to the accompanying drawings.

First Embodiment

FIGS. 1 to 11 are views showing a first embodiment of the torsional vibration attenuation apparatus according to the present invention First, the construction of the embodiment of the torsional vibration attenuation apparatus according to the present invention will be explained hereinafter.

Figure 1:
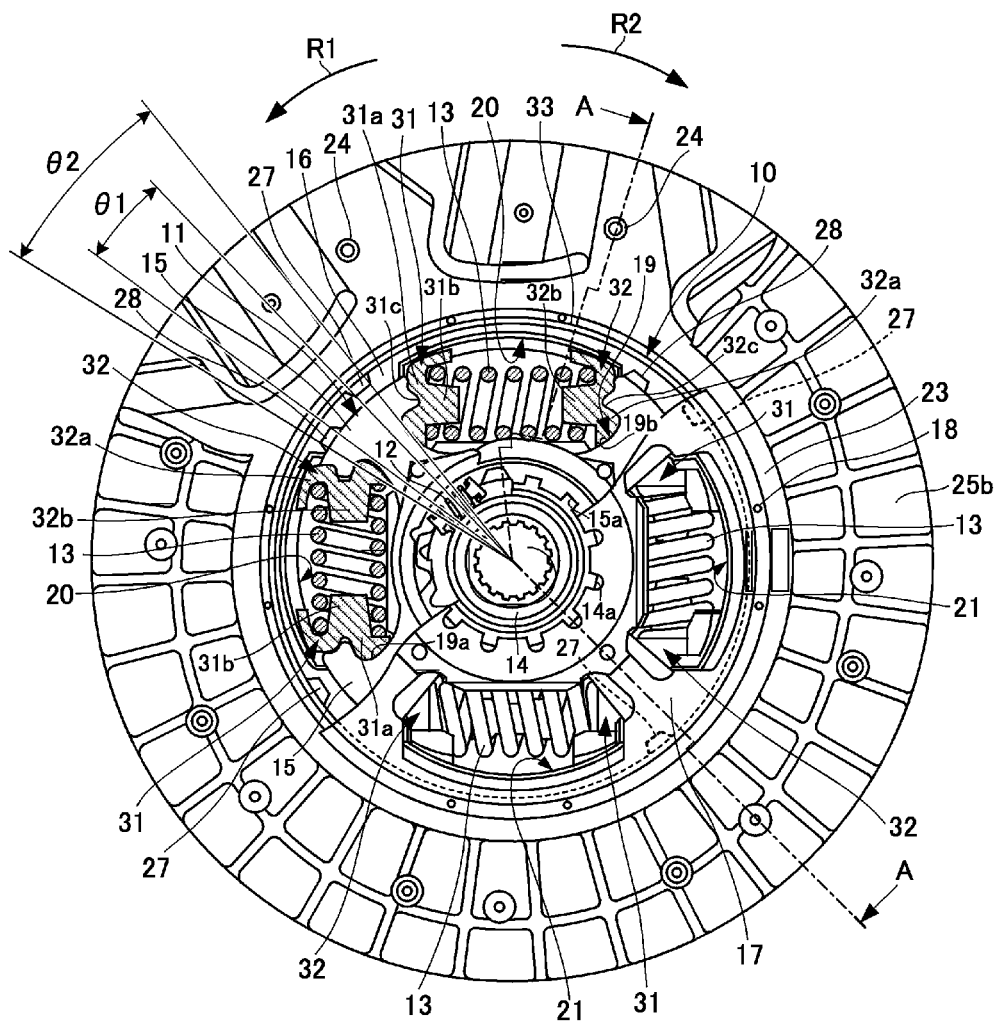
FIG. 1 is a view showing a first embodiment of a torsional vibration attenuation apparatus according to the present invention, and a front view of the torsional vibration attenuation apparatus.
Figure 2:
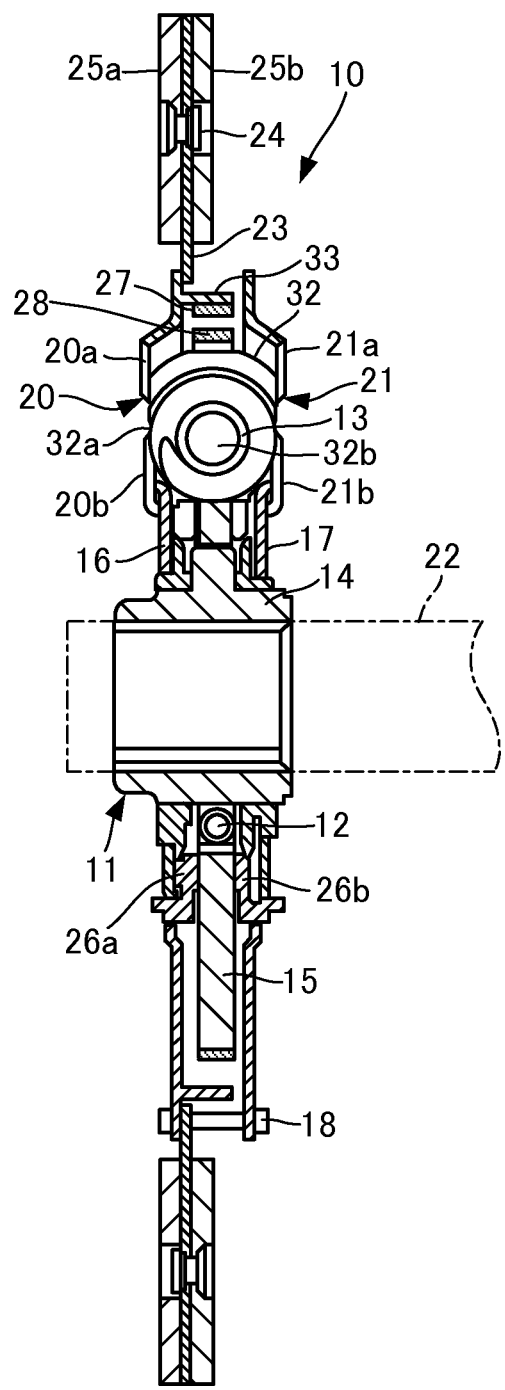
FIG. 2 is a view showing the first embodiment of the torsional vibration attenuation apparatus according to the present invention, and a cross-sectional view taken along the chain line and seen from the arrows A-A in FIG. 1.
Figure 3:
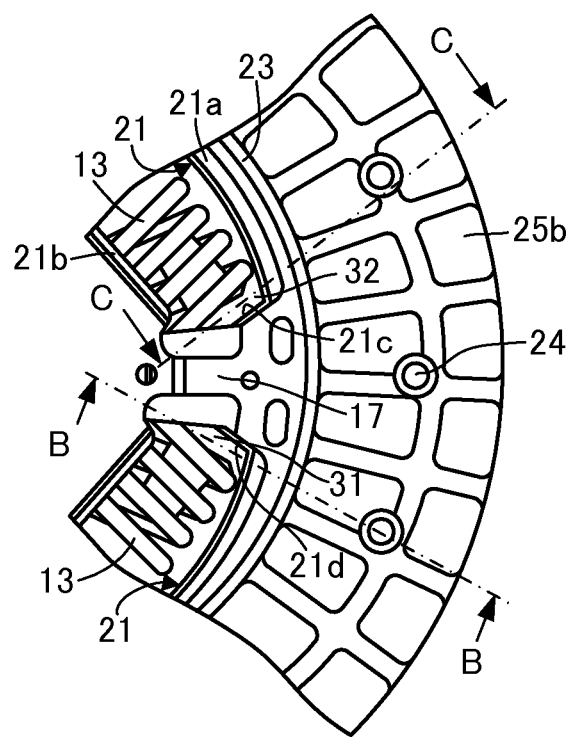
FIG. 3 is a view showing the first embodiment of the torsional vibration attenuation apparatus according to the present invention, and a front view of an essential portion of the torsional vibration attenuation apparatus.
Figure 4:
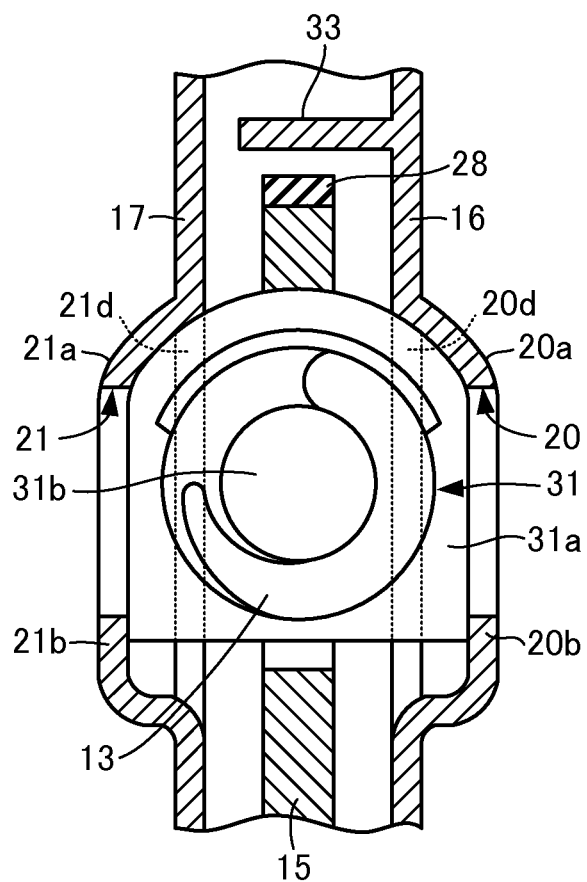
FIG. 4 is a view showing the first embodiment of the torsional vibration attenuation apparatus according to the present invention, and a fragmentally cross-sectional view taken along the chain line and seen from the arrows B-B in FIG. 3.
Figure 5:
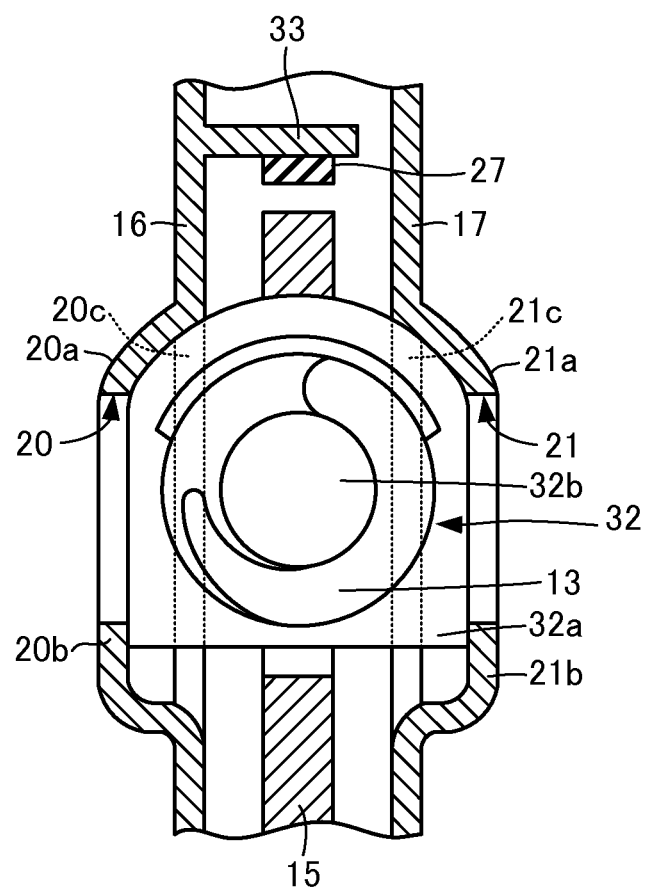
FIG. 5 is a view showing the first embodiment of the torsional vibration attenuation apparatus according to the present invention, and a fragmentally cross-sectional view taken along the chain line and seen from the arrows C-C in FIG. 3.

The torsional vibration attenuation apparatus 10 is shown in FIGS. 1 and 2 to comprise a hub member 11 constituting a second rotation member, disc plates 16, 17 coaxially disposed with the hub member 11, relatively rotatably disposed with respect to the hub member 11 and constituting a first rotation member, four coil springs 13 having the hub member 11 and the disc plates 16, 17 circumferentially resiliently connected with each other and constituting resilient members, and the spring seats 31, 32 having each of the coil springs 13 supported by the hub member 11.

The hub member 11 is constituted by a boss 14, and a flange 15 radially outwardly projecting from the boss 14. The boss 14 is splined at its inner peripheral portion to an input shaft 22 of a transmission forming part of the drive train not shown in the drawings.

The boss 14 has an outer peripheral portion formed with splines 14a, while the flange 15 has an inner peripheral portion formed with splines 15a. The splines 14a are held in spline connection with the splines 15a with predetermined gaps circumferentially formed therebetween.

Between the outer peripheral portion of the boss 14 and the inner peripheral portion of the flange 15 is provided a small spring 12 which is designed to absorb extremely small vibrations generated between the boss 14 and the flange 15. The boss 14 and the flange 15 are relatively rotatable with respect to each other by the gaps circumferentially formed between the splines 14a, 15a.

The above construction makes it possible to suppress gear clattering noises, i.e., "garagara" noises, what is called gara noises, from being generated from the gear pairs forming parts of the transmission under no-load state in the small area of the fluctuation torque of the internal combustion engine appearing when the vehicle is changed from the idle state to the neutral state, viz., in the small torsion angle state between the hub member 11 and the disc plates 16, 17.

The disc plates 16, 17 are disposed at the both axial sides of the hub member 11, and connected at their radially outer end portions with each other by rivets 18.

The hub member 11 is formed with four spring accommodation holes 19, while the disc plates 16, 17 are formed with four window holes 20, 21 in opposing relationship with the spring accommodation holes 19, respectively. Each of the coil springs 13 is accommodated in each of the spring accommodation holes 19 and each of the window holes 20, 21. The spring accommodation holes 19 are each constituted by a groove formed by punching the radially outer portion of the flange 15, while the window holes 20, 21 are each in the form of an opening surrounded by the disc plates 16, 17.

The circumferential ends of each of the coil springs 13 are seated on a spring seat 31 and a spring seat 32, respectively, which are in turn supported by the circumferential end portions of the spring accommodation holes 19 of the hub member 11, respectively. Here, the term "circumferential direction" is identical to the rotation direction of the disc plates 16, 17 and the hub member 11, while the term "radial direction" is identical to the radial direction of the disc plates 16, 17 and the hub member 11.

The spring seats 31, 32 are provided with spring seat seating portions 31a, 32a each formed at the inner peripheral portion with a winding roll seat, and projection portions 31b, 32b circumferentially projecting from the spring seat seating portions 31a, 32a, respectively.

The spring seat seating portions 31a, 32a have respective inner peripheral portions formed with winding roll seats, respectively. The winding roll seats are in the form to receive one or two windings of the circumferential both end portions of the coil spring 13. The winding roll seats allow the circumferential both end portions of the coil spring 13 to seat thereon.

The winding roll seats of the spring seat 31 are respectively formed with engagement portions held in engagement with the winding starting ends of the coil spring 13, while the winding roll seats of the spring seat 32 are formed with engagement portions held in engagement with the winding finishing ends of the coil spring 13. The engagement portions of the winding roll seats of the spring seats 31, 32 held in the winding starting ends and the winding finishing ends of the coil spring 13 enable the coil spring 13 to be seated on the spring seats 31, 32 in such a state that the coil spring 13 can be prevented from being rotated with respect to the spring seats 31, 32.

The circumferential end portions 19a, 19b of the spring accommodation hole 19 are held in engagement with the back surfaces of the spring seat seating portions 31a, 32a, i.e., the circumferential end portions 31c, 32c of the spring seats 31, 32.

More concretely, the circumferential end portions 19a, 19b of the spring accommodation hole 19 are contoured along the circumferential end portions 31c, 32c of the spring seats 31, 32, so that the circumferential end portions 19a, 19b of the spring accommodation hole 19 are snugly engaged with the circumferential end portions 31c, 32c of the spring seats 31, 32.

For this reason, the spring seats 31, 32 can receive the urging force of the coil spring 13 to be urged toward the circumferential end portions 19a, 19b of the spring accommodation hole 19, so that the circumferential end portions 31c, 32c of the spring seats 31, 32 are brought into engagement with the circumferential end portions 19a, 19b of the spring accommodation hole 19 under the strong pressing force, thereby causing the spring seats 31, 32 to be firmly attached to the flange 15 of the hub member 11.

As shown in FIGS. 2 to 5, the window holes 20, 21 respectively have outer supporting edge portions 20a, 21a, circumferentially extending along the radially outer edges of the window holes 20, 21 and inner supporting edge portions 20b, 21b circumferentially extending along the radially inner edges of the window holes 20, 21. The outer supporting edge portions 20a, 21a and the inner supporting edge portions 20b, 21b are bent and projected axially outwardly of the disc plates 16, 17.

The circumferential end portions 20c, 21c, 20d, 21d of the window holes 20, 21 are positioned axially inwardly of the disc plates 16, 17 with respect to the outer supporting edge portions 20a, 21a and the inner supporting edge portions 20b, 21b. The circumferential end portions 20c, 21c, 20d, 21d of the window holes 20, 21 are held in engagement with the circumferential end portions 31c, 32c of the spring seats 31, 32.

Therefore, the spring seats 31, 32 are disposed between the circumferential end portions 19a, 19b of the window hole 19 and the both circumferential end surfaces of the coil spring 13, and between the circumferential end portions 20c, 21c, 20d, 21d of the spring accommodation holes 20, 21 and the both circumferential end surfaces of the coil spring 13.

The spring seats 31, 32 have respective radially outer peripheral portions positioned radially outwardly of the spring accommodation holes 19, and respective radially inner peripheral portions positioned radially inwardly of the radially inner peripheral portions of the window holes 20, 21.

As shown in FIGS. 1 and 2, the torsional vibration attenuation apparatus 10 thus constructed further comprises an annular cushioning plate 23 having a radially inner peripheral portion securely connected with the radially outer peripheral portion of the disc plate 16. For the connection of the disc plate 16 and the cushioning plate 23 are used rivets 18 which are in turn designed to have the disc plates 16, 17 connected with each other.

The cushioning plate 23 has both axial sides securely connected with annular friction materials 25a, 25b by rivets 24. The friction materials 25a, 25b are disposed between a flywheel not shown drivably connected with a crank shaft forming part of the internal combustion engine and a pressure plate forming part of a clutch cover bolted to the flywheel.

The friction plates 25a, 25b are pressurized to the pressure plate to bring the pressure plate into frictional engagement with the flywheel, thereby making it possible to input the rotational torque of the internal combustion engine to the disc plates 16, 17.

When the clutch pedal not shown is depressed, the pressure plate is operated to release the friction materials 25a, 25b from being pressurized to have the friction materials 25a, 25b moved away from the flywheel, thereby making it possible not to input the rotational torque of the internal combustion engine to the disc plates 16, 17.

When the hub 11 is twisted with respect to the disc plates 16, 17 in the positive rotation side (R2 direction in FIG. 1) or in the negative rotation side (R1 direction in FIG. 1), each of the coil springs 13 is compressed to have the spring seat 31 or the spring seat 32 selectively move along each of the window holes 20, 21.

The coil spring 13 is compressed when the hub 11 is twisted with respect to the disc plates 16, 17 in the positive rotation side, and when the hub 11 is twisted with respect to the disc plates 16, 17 in the negative rotation side, so that the rotational torque can be transmitted between the hub 11 and the disc plates 16, 17, viz., from the disc plates 16, 17 to the hub 11 or from the hub 11 to the disc plates 16, 17.

The positive twisting of the hub 11 with respect to the disc plates 16, 17 occurs at the acceleration time of the vehicle, while the negative twisting of the hub 11 with respect to the disc plates 16, 17 occurs at the deceleration time of the vehicle when the engine brake is generated.

Further, on the outer peripheral portion of the boss 14 between the flange 15 and the disc plates 16, 17 are disposed friction materials 26a, 26b, respectively, each constituting a hysteresis torque generation member. The friction materials 26a, 26b are provided to circumferentially extend, and are engaged with the disc plates 16, 17, respectively, to be supported on the disc plates 16, 17.

The friction materials 26a, 26b are held in friction contact with the flange 15 and the disc plate 16 under a predetermined friction force, so that a hysteresis torque is generated on the hub member 11 and the disc plate 16 when the hub member 11 and the disc plates 16, 17 are relatively rotated with respect to each other.

On the other hand, the disc plate 16 has a radially outer peripheral portion integrally attached with a guide plate 33 constituting a guide member. The guide plate 33 has a curved surface identical in shape to the rotation path of the radially outer end of the flange 15 and extending in the circumferential direction of the disc plate 16.

The guide plate 33 has an inner peripheral portion provided with a friction material 27 facing the hub member 11 and constituting a first friction material.

The flange 15 has a radially outer whole end positioned radially inwardly of the guide plate 33 and provided with a friction material 28 constituting a second friction material. The friction materials 27, 28 are frictionally contactable with each other when the hub member 11 is twisted, viz., relatively rotated in the positive side with respect to the disc plates 16, 17.

From the foregoing description, it will be appreciated that the torsional vibration attenuation apparatus according to the present embodiment is constructed to have the friction materials 27, 28 provided on the radially facing surfaces of the disc plate 16 and the hub member 11 to be brought into face-to-face relationship with each other when the disc plates 16, 17 are twisted in the positive side with respect to the hub member 11.

Here, the friction materials 27, 28 and the guide plate 33 constitute friction contact members, respectively as defined in the present invention. The friction materials 27, 28, the guide plate 33 and the friction materials 26a, 26b collectively constitute a hysteresis mechanism as defined in the present invention.

The friction material 27 is provided on the guide plate 33 in such a manner that the friction material 27 is contactable in its circumferential whole surface area with the friction material 28 with the circumferentially central portion of the friction material 27 being positioned on the same radial line with the circumferentially central portion of the friction material 28 when the hub member 11 is twisted in the positive side from its neutral position (torsion angle of zero degree) by a predetermined angle (for example about 15 degrees) with respect to the disc plates 16, 17.

This means that the friction materials 27, 28 can frictionally be engaged to increase the positive side hysteresis torque when the hub member 11 is twisted in the positive side by the predetermined angle with respect to the disc plates 16, 17.

It will therefore be understood that the friction materials 27, 28 are provided in the range in which the hub member 11 is relatively rotated in the positive side by the predetermined (from θ1 to θ2 in FIG. 1) with respect to the disc plates 16, 17.

The friction materials 27, 28 have respective friction coefficients, thicknesses and the like appropriately set for designing the torsional vibration attenuation apparatus of this kind, so that the sliding resistance, i.e., the hysteresis torque of the friction materials 27, 28 frictionally contacted with each other can be made larger than the hysteresis torque of the hub member 11 and the disc plates 16, 17 frictionally contacted with each other through the friction materials 26a, 26b.

The present embodiment is constructed to generate the hysteresis torques when the hub member 11 is twisted in the positive side and the negative side with respect to the disc plates 16, 17 through the friction materials 26a, 26b, the positive and negative side hysteresis torques being identical to each other, so that the hysteresis torque generated when the hub member 11 is twisted in the positive side to have the friction materials 27, 28 frictionally contacted with each other can be made larger than the hysteresis torque generated when the hub member 11 is twisted in the negative side.

Next, the operation of the first embodiment of the torsional vibration attenuation apparatus according to the present invention will be explained hereinafter.

When the torsional vibration attenuation apparatus 10 is applied with no rotational torque sufficiently large to have the coil spring 13 compressed, the relative rotation angle between the hub member 11 and the disc plates 16, 17 is maintained at around zero degree.

When the friction materials 25a, 25b are pressed by the pressure plate, thereby being brought into friction contact with the flywheel and the pressure plate, the rotational torque of the internal combustion engine is inputted to the disc plates 16, 17, so that the rotational torque can be transmitted to the disc plates 16, 17 through the cushioning plate 23.

At this time, the rotational fluctuation caused by the torque fluctuation of the internal combustion engine applied to the torsional vibration attenuation apparatus 10 is transmitted to the input shaft 22 of the transmission while being absorbed between the disc plates 16, 17 and the hub member 11 by the coil spring 13 compressed.

Next, the explanation will be directed to the actions of the hub member 11 to be performed when twisted in the positive side and the negative side with respect to the disc plates 16, 17. Here, the rotation direction of the disc plates 16, 17 in which the rotational torque from the internal combustion engine is transmitted to the disc plates 16, 17 is assumed to be an R1 direction.

In response to the increased rotational fluctuation of the internal combustion engine at the acceleration time of the vehicle, the relative rotation between the disc plates 16, 17 and the hub member 11 is increased, viz., the torsion angle comes to be increased, so that the hub member 11 is twisted in the positive side with respect to the disc plates 16, 17 to have the coil springs 13 compressed, thereby transmitting the rotational torque from the disc plates 16, 17 to the hub member 11.

As the disc plates 16, 17 are rotated in the R1 direction with the increased torsion angle of the disc plates 16, 17 and the hub member 11, the hub member 11 is relatively rotated in the R2 direction (positive side) with respect to the disc plates 16, 17.

The actions of the disc plates 16, 17 and the hub member 11 performed at this time will be explained with reference to FIGS. 6, 7. Here, the disc plate 16 is not illustrated in FIGS. 6, 7, but the disc plate 16 is moved in the same action with the disc plate 17 since the disc plate 16 is moved in parallel with the disc plate 17.

Figure 6:
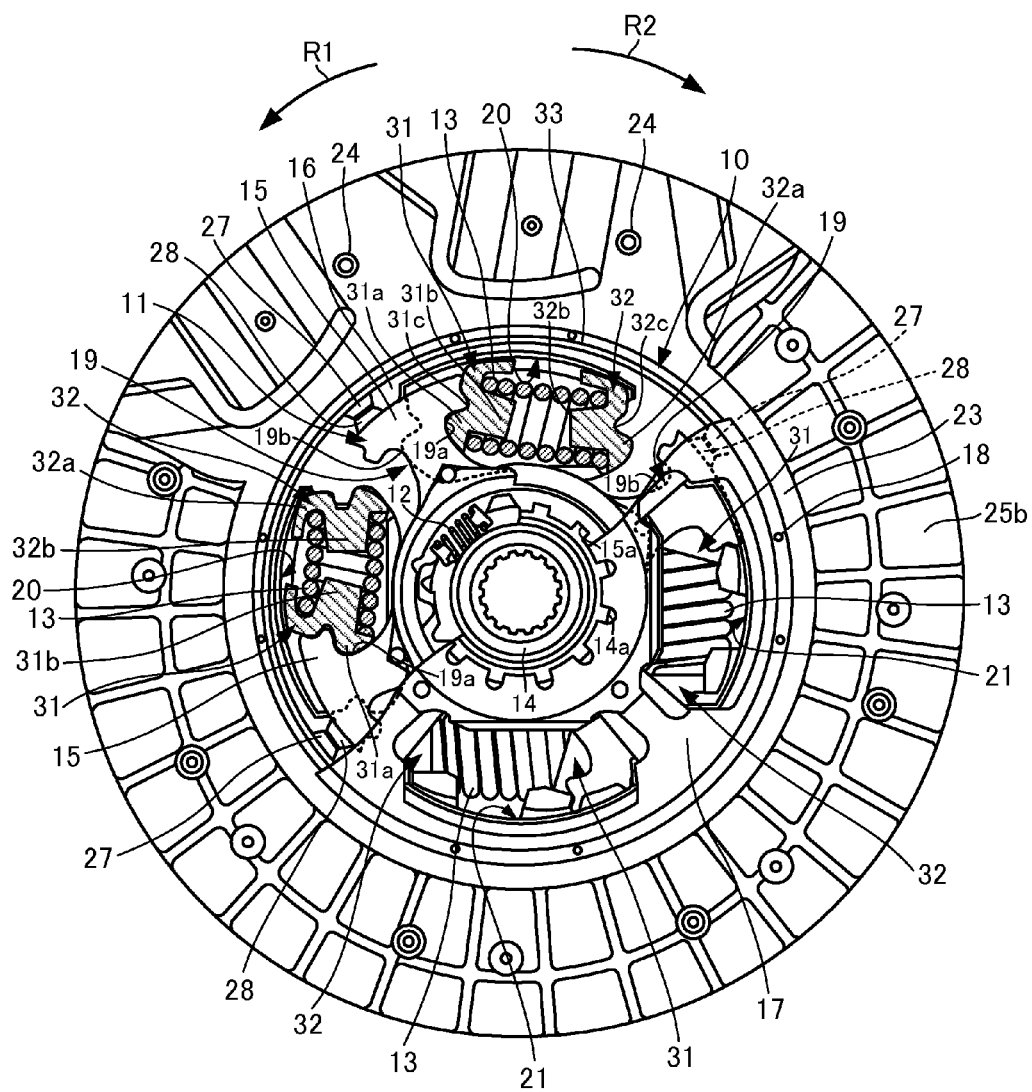
FIG. 6 is a view showing the first embodiment of the torsional vibration attenuation apparatus according to the present invention, and showing the whole operation of the torsional vibration attenuation apparatus at the acceleration time.
Figure 7:
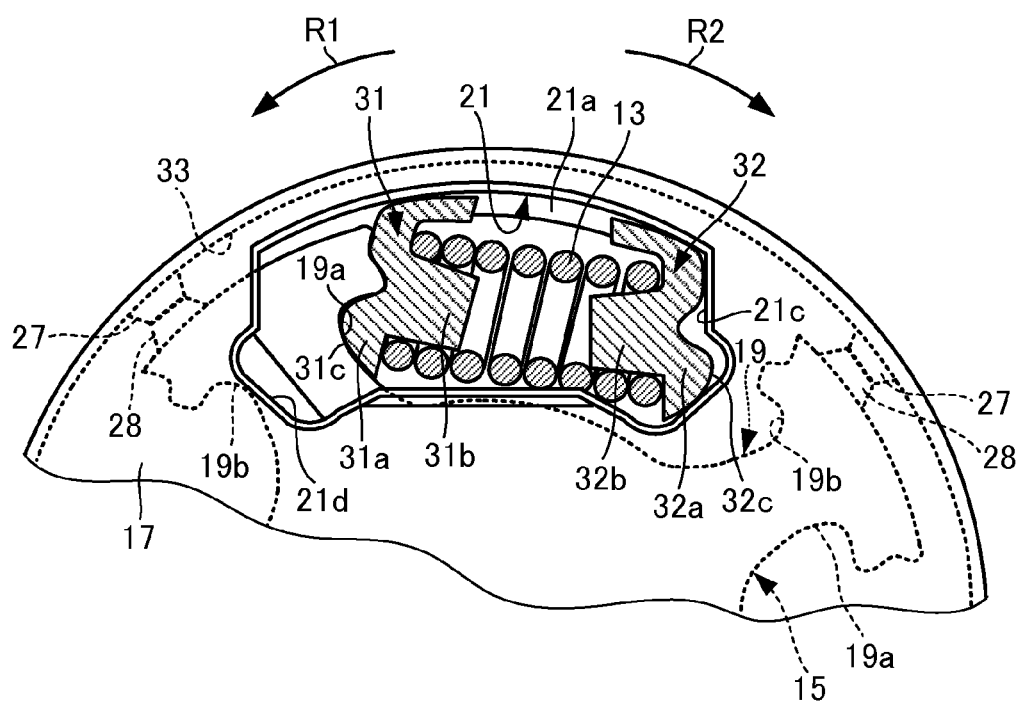
FIG. 7 is a view showing the first embodiment of the torsional vibration attenuation apparatus according to the present invention, and showing the partial operation of the torsional vibration attenuation apparatus at the acceleration time.

When the disc plates 16, 17 are rotated in the R1 direction in FIGS. 6, 7, the spring seat 32 is pressed toward the spring seat 31 by the circumferential end portions 20c, 21c of the window holes 20, 21 of the disc plates 16, 17. At this time, the circumferential end portion 19b of the spring accommodation hole 19 of the hub member 11 is spaced apart from the spring seat 32.

As the hub member 11 is, on the other hand, relatively rotated in the R2 direction (positive side) with respect to the disc plates 16, 17, the spring seat 31 is pressed toward the spring seat 32 by the circumferential end portion 19a of the spring accommodation hole 19 of the hub member 11.

At this time, the spring seat 31 is spaced apart from the circumferential end portions 20d, 21d of the window holes 20, 21.

In the small torsion angle area of the disc plates 16, 17 and the hub member 11, the disc plates 16, 17 and the hub member 11 are frictionally contacted with each other through the friction materials 26a, 26b. At this time, the sliding resistance of the disc plates 16, 17 and the hub member 11 is maintained at a small level, thereby leading to the hysteresis torque of the hub member 11 and the disc plates 16, 17 having a small torque value.

Figure 9:
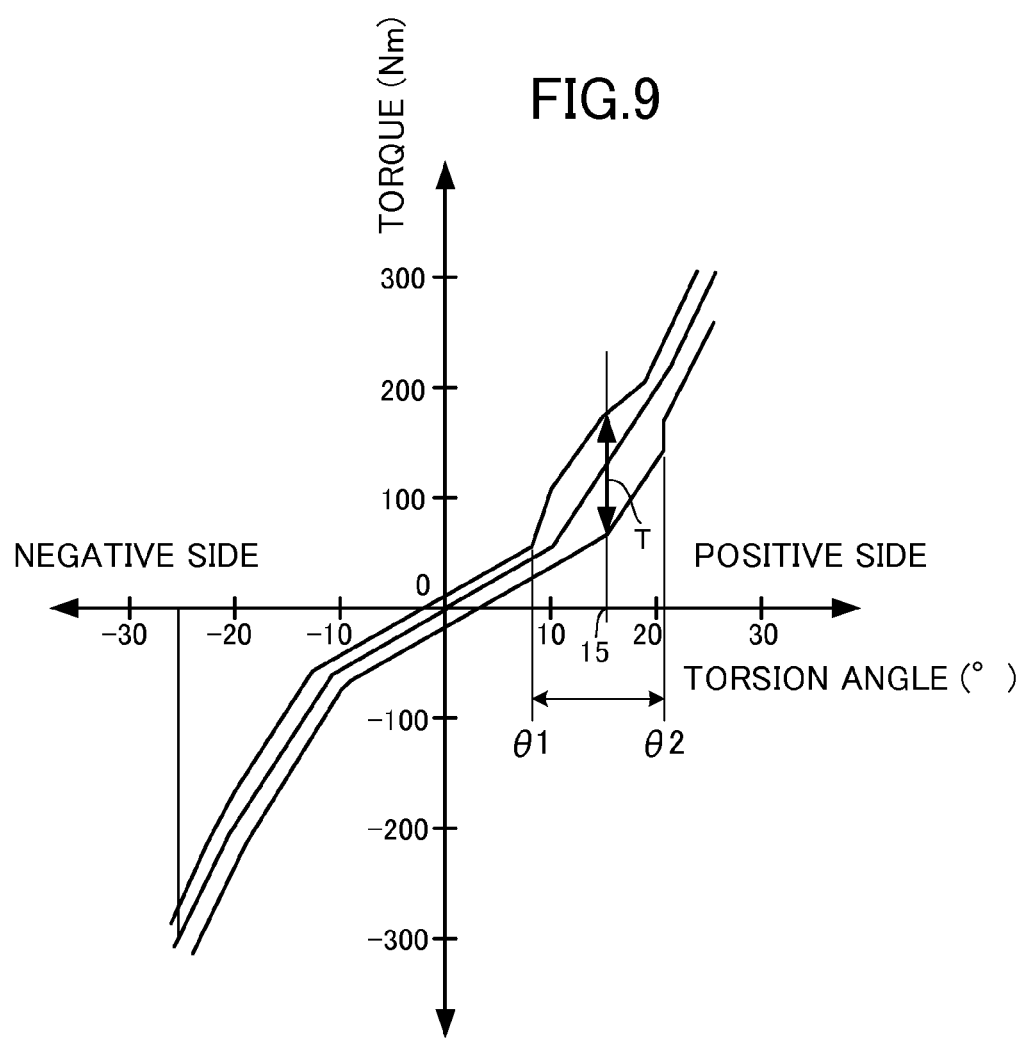
FIG. 9 is a view showing the first embodiment of the torsional vibration attenuation apparatus according to the present invention, and showing a relationship between the torsion angle and the hysteresis torque of the torsional vibration attenuation apparatus.

When the torsion angle of the disc plates 16, 17 and the hub member 11 is increased toward a certain torsion angle level (from θ1 to θ2 in FIG. 9), the friction material 28 at the radially outer end of the flange 15 is frictionally contacted with the friction material 27 of the guide plate 33, thereby leading to the sliding resistance of the disc plates 16, 17 being increased to a certain sliding resistance level to have the hysteresis torque of the hub member 11 and the disc plates 16, 17 rapidly increased as shown by a symbol T in FIG. 9.

When the torsion angle of the disc plates 16, 17 and the hub member 11 is further increased toward a certain torsion angle level, the friction material 28 is moved to the downstream side of the friction material 27 to have the friction materials 27, 28 brought out of friction contact with each other, thereby leading to the sliding resistance of the disc plates 16, 17 being decreased to have the hysteresis torque of the hub member 11 and the disc plates 16, 17 decreased.

It is therefore understood from the foregoing description that the spring seats 31, 32 are moved toward each other to have the coil spring 13 compressed, so that the rotation fluctuation of the internal combustion engine can be absorbed between the disc plates 16, 17 and the hub member 11 thereby making it possible to transmit the rotational torque of the internal combustion engine to the input shaft 22 of the transmission while generating the hysteresis torque varied in response to the torsion angle of the hub member 11 and the disc plate 16.

When, on the other hand, the rotational torque of the internal combustion engine is decreased to a certain rotational torque level at the deceleration time of the vehicle due to the engine brake generated, the rotational torque is inputted to the hub member 11 from the input shaft 22 of the transmission.

When the rotational fluctuation of the internal combustion engine is increased to a certain rotational fluctuation level at the deceleration time of the vehicle, the torsion angle of the disc plates 16, 17 and the hub member 11 is increased to have the hub member 11 twisted in the negative side with respect to the disc plates 16, 17, thereby having the coil spring 13 compressed to transmit the rotational torque to the disc plates 16, 17 from the hub member 11.

When the torsion angle of the disc plates 16, 17 and the hub member 11 is increased to a certain torsion angle level, the hub member 11 is rotated in the R1 direction. In response to the rotation of the hub member 11 in the R1 direction, the hub member 11 is relatively rotated in the R1 direction (negative side) from the neutral position with respect to the disc plates 16, 17.

The actions of the disc plates 16, 17 and the hub member 11 to be performed at this time will be explained with reference to FIG. 8. Here, the disc plate 16 is not illustrated in FIGS. 8, but the disc plate 16 is moved in the same action with the disc plate 17 since the disc plate 16 is moved in parallel with the disc plate 17.

Figure 8:
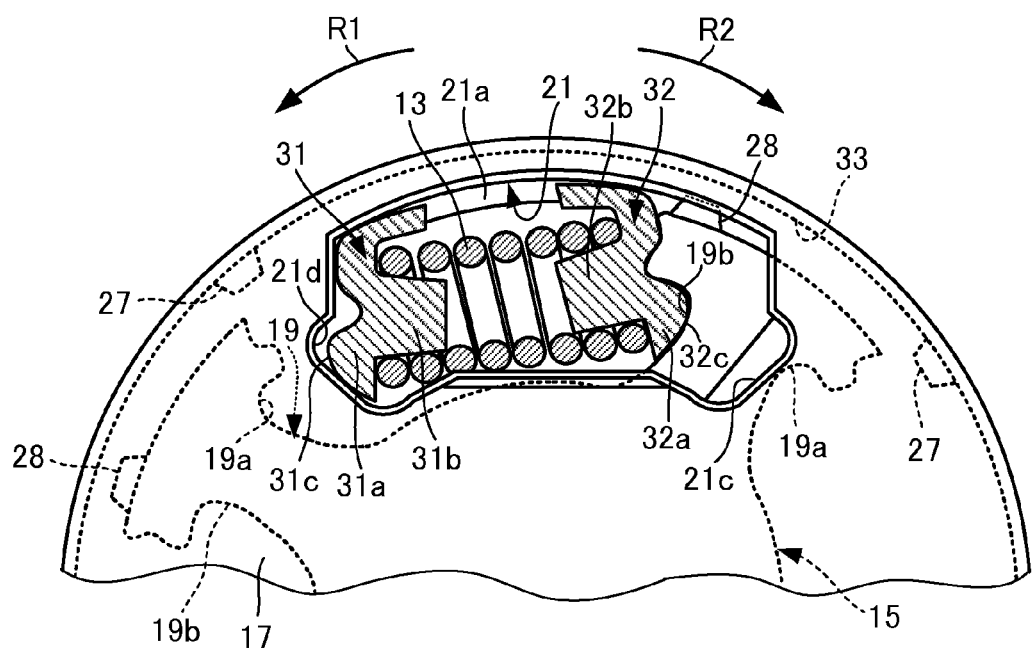
FIG. 8 is a view showing the first embodiment of the torsional vibration attenuation apparatus according to the present invention, and showing the partial operation of the torsional vibration attenuation apparatus at the deceleration time.

When the hub member 11 is relatively rotated in the R1 direction (negative side) with respect to the disc plates 16, 17 in FIG. 8, the spring seat 31 is pressed toward the spring seat 32 by the circumferential end portions 20d, 21d of the window holes 20, 21 of the disc plates 16, 17. At this time, the circumferential end portion 19a of the spring accommodation hole 19 of the hub member 11 is spaced apart from the spring seat 31, and the friction materials 27 and 28 are spaced apart from each other in the rotation direction of the disc plates 16, 17 (R1 direction).

In response to the relative rotation of the hub member 11 in the R1 direction (negative side) with respect to the disc plates 16, 17, the spring seat 32 is pressed toward the spring seat 31 by the circumferential end portion 19b of the spring accommodation hole 19 of the hub member 11.

At this time, the spring seat 32 is spaced apart from the circumferential end portions 20c, 21c of the window holes 20, 21 of the disc plates 16, 17. In the small torsion angle area of the disc plates 16, 17 and the hub member 11, the disc plates 16, 17 and the hub member 11 are frictionally contacted with each other through the friction materials 26a, 26b. At this time, the sliding resistance of the disc plates 16, 17 and the hub member 11 is maintained at a smaller level than that of the disc plates 16, 17 and the hub member 11 generated when the hub member 11 is relatively rotated in the positive side with respect to the disc plates 16, 17, thereby leading to the hysteresis torque of the hub member 11 and the disc plates 16, 17 having a smaller torque value than that of the disc plates 16, 17 and the hub member 11 generated when the hub member 11 is relatively rotated in the positive side with respect to the disc plates 16, 17.

It will therefore be understood that the spring seats 31, 32 are moved toward each other to have the coil spring 13 compressed, so that the rotation fluctuation of the internal combustion engine can be absorbed between the disc plates 16, 17 and the hub member 11 while generating the hysteresis torque smaller than in the positive side between the hub member 11 and the disc plate 16.

Figure 10:
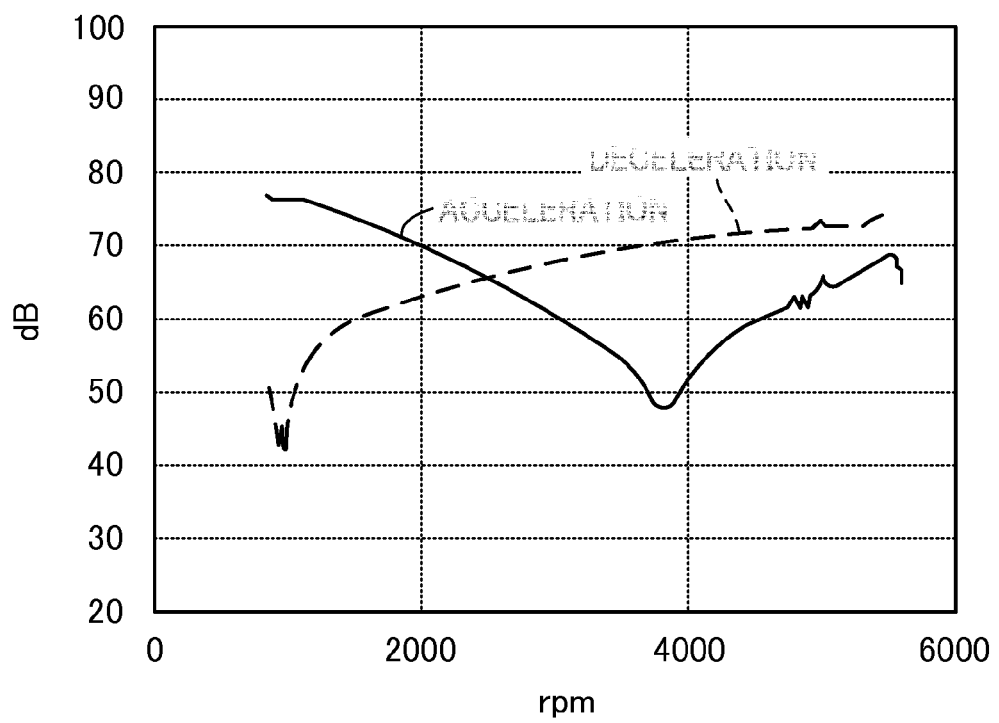
FIG. 10 is a view showing the first embodiment of the torsional vibration attenuation apparatus according to the present invention, and showing a relationship between the rotational fluctuations of the internal combustion engine and the rotational speed of the internal combustion engine.
Figure 11:
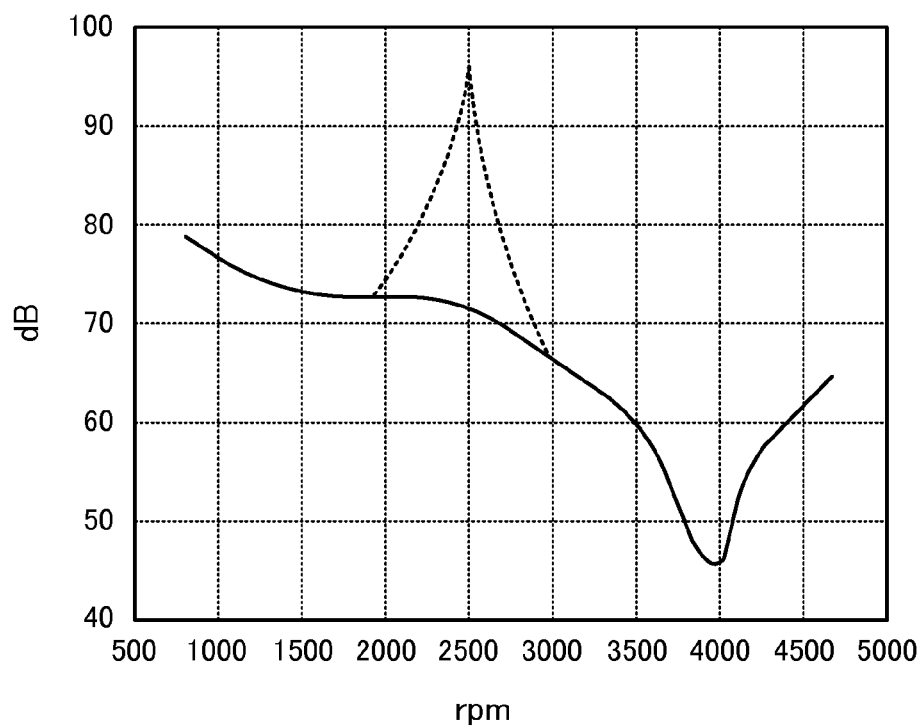
FIG. 11 is a view showing the first embodiment of the torsional vibration attenuation apparatus according to the present invention, and showing a relationship between the rotational fluctuations of the internal combustion engine and the rotational speed of the internal combustion engine with the hysteresis torque being reduced to a smaller level at the acceleration time.

Here, the rotational fluctuation of the internal combustion engine at the acceleration time of the vehicle is large in the low speed rotation area of the internal combustion engine, but small in the high speed rotation area of the internal combustion engine as compared with the low speed rotation area of the internal combustion engine as shown in FIG. 10. From the foregoing description, it will be appreciated that the rotational fluctuation of the internal combustion engine at the deceleration time of the vehicle is large in the high speed rotation area of the internal combustion engine. This means that the rotational fluctuations of the internal combustion engine between the acceleration time and the deceleration time of the vehicle are different in property from each other.

From the foregoing description, it will be appreciated that the torsional vibration attenuation apparatus according to the present embodiment is constructed to have the friction materials 27, 28 provided on the radially facing surfaces of the disc plates 16, 17 and the hub member 11 to be brought into face-to-face relationship with each other when the hub member 11 is twisted in the positive side by the predetermined angle with respect to the disc plates 16, 17, so that the hysteresis torque generated when the hub member 11 is twisted in the positive side by the predetermined angle with respect to the disc plates 16, 17 can be made larger than the hysteresis torque generated when the hub member 11 is twisted in the negative side by the predetermined angle with respect to the disc plates 16, 17.

For this reason, as shown in FIG. 10, the friction material 27 is moved to the circumferentially downstream side of the friction material 28, thereby having the friction materials 27, 28 brought out of contact with each other when the torsion angle of the hub member 11 and the disc plates 16, 17 is increased in the low speed rotation area of the internal combustion engine in which the rotational fluctuation is at a relatively large level (for example below 1800 rpm).

At this time, the disc plates 16, 17 and the hub member 11 are frictionally contacted with each other through the friction materials 26a, 26b, so that the hysteresis torque of the hub member 11 and the disc plates 16, 17 comes to be a small torque vale, thereby making it possible to effectively attenuate the torsional vibrations and to suppress the chinking noises from being generated.

When the rotational speed of the internal combustion engine is further increased, the rotational speed of the internal combustion engine passes the rotational speed corresponding to the torsional resonance point (for example around 2500 rpm for a FF vehicle). In the conventional apparatus, the torsional vibrations are increased by the torsional resonance of the drive train as shown by the dashed line in FIG. 11 around the resonance point when the rotational speed of the internal combustion engine passes the torsional resonance point. In contrast, the torsional vibration attenuation apparatus according to the present embodiment is constructed to have the friction materials 27, 28 frictionally contactable with each other, thereby making it possible to increase the hysteresis torque of the hub member 11 and the disc plates 16, 17 when the hub member 11 is twisted with respect to the disc plates 16, 17 in the rotational speed area in which the torsional resonance is generated. For this reason, the torsional resonance can be suppressed, so that the muffled noises can be suppressed from being generated as well as the chinking noises can also be suppressed from being generated.

This means that the friction material 27 forming part of the torsional vibration attenuation apparatus according to the present embodiment is provided in the torsion angle area of the hub member 11 and the disc plates 16, 17 to be frictionally contactable with the friction material 28 in the rotation area of the internal combustion engine in which the torsional resonance is generated.

When the rotational speed of the internal combustion engine is further increased, the rotational fluctuation of the internal combustion engine is decreased. At this time, the torsion angle of the hub member 11 and the disc plates 16, 17 is decreased to have the friction material 28 positioned at the upstream side of the friction material 27 in the rotation direction, so that the friction materials 27, 28 are brought out of contact with each other.

At this time, the hub member 11 and the disc plates 16, 17 are frictionally contacted with each other through the friction materials 26a, 26b, so that the hysteresis torque of the hub member 11 and the disc plates 16, 17 comes to be a small torque value, thereby making it possible to effectively attenuate the small torsional vibrations.

When, on the other hand, the hub member 11 is twisted in the negative side with respect to the disc plates 16, 17 at the deceleration time of the vehicle, the friction materials 27, 28 are not provided on the radially facing surfaces of the hub member 11 and the disc plate 16, thereby leading to having the hub member 11 and the disc plates 16, 17 frictionally contacted with each other through the friction materials 26a, 26b.

The sliding resistance of the hub member 11 and the disc plates 16, 17 caused at this time is small as compared with the sliding resistance of the hub member 11 and the disc plates 16, 17 caused when the friction materials 27, 28 are frictionally contacted, thereby making it possible to reduce the hysteresis torque.

For this reason, the torsional vibrations can be attenuated in the high rotation area of the internal combustion engine with the large rotational fluctuation of the internal combustion engine at the deceleration time of the vehicle, thereby making it possible to suppress the chinking noises from being generated.

As will be appreciated from the previous description, the torsional vibration attenuation apparatus 10 according to the present embodiment can be made simple in construction only with the friction materials 27, 28 and the guide plate 33, the friction materials 27, 28 being frictionally contacted with each other when the hub member 11 is relatively rotated in the positive side with respect to the disc plates 16, 17, thereby making it possible to allow the hysteresis torque to be variable in the positive side (at the acceleration time) and the negative side (at the deceleration time), so that the production operation of the torsional vibration attenuation apparatus 10 can be improved, and the production cost of the torsional vibration attenuation apparatus 10 can be prevented from being increased.

In particular, the friction contact members in the present embodiment are constituted by the guide plate 33 provided on the disc plate 16 to have a curved surface identical in shape to the rotation path of the radially outer end of the hub member 11 and to extend in the circumferential direction of the disc plates 16, 17, the friction material 27 provided on the guide plate 33, and the friction material 28 provided on the radially outer end of the flange 15 of the hub member 11 to be positioned radially inwardly of the guide plate 33, the friction material 28 being frictionally contactable with the friction material 27 when the hub member 11 is twisted in the positive side with respect to the disc plates 16, 17.

For this reason, the torsional vibration attenuation apparatus 10 according to the present embodiment can be made simple in construction only with the friction materials 27, 28 and the guide plate 33 provided on the hub member 11 and the disc plate 16, thereby making it possible to allow the hysteresis torque in the positive side to be larger than the hysteresis torque in the negative side.

In addition, the friction material 27 is provided on the guide plate 33 having a curved surface identical in shape to, viz., slightly larger than (hereinafter simply referred to as "identical in shape to") the rotation path of the radially outer end of the flange 15 and extending in the circumferential direction of the disc plate 16, so that the friction material 28 can frictionally be contacted with the friction material 27 without fail when the hub member 11 is twisted in the positive side with respect to the disc plates 16, 17, thereby making it possible to allow the hysteresis torque in the positive side to be larger than the hysteresis torque in the negative side.

Further, the friction materials 27, 28 are provided in the range in which the hub member 11 is relatively rotated in the positive side with respect to the disc plates 16, 17, so that the hysteresis torque can be increased when the torsion angle of the disc plates 16, 17 and the hub member 11 becomes a torsion angle corresponding to the resonance point of the rotational speed of the internal combustion engine.

As a result, the torsional vibration attenuation apparatus 10 according to the present embodiment can reduce the hysteresis torque to sufficiently attenuate the small torsional vibrations in the rotation area of the internal combustion engine with the reduced rotation fluctuation of the internal combustion engine, and can increase the hysteresis torque in the rotation area of the internal combustion engine in which the torsional resonance is generated, thereby making it possible to suppress the chinking noises and the muffled noises caused by the torsional resonance.

Further, the magnitude of the hysteresis torque generated when the hub member 11 is relatively rotated in the positive side with respect to the disc plates 16, 17 can freely be set in response to the torsion angle of the disc plates 16, 17 and the hub member 11, thereby making it possible to improve the degree of freedom for setting the hysteresis torque.

Due to the fact that the present embodiment further comprises the friction materials 26a, 26b provided to extend in the circumferential direction of the disc plate 16 and the hub member 11 for frictionally contacting the disc plate 16 and the hub member 11 with each other, the hysteresis torques the same in magnitude in the positive side and the negative side can be generated.

In addition, the present embodiment is constructed to set the friction resistance values of the friction materials 27, 28 to make the hysteresis torque in the positive side larger than the hysteresis torque in the negative side, the hysteresis torque in the positive side being generated when the hub member 11 is relatively rotated in the positive side with respect to the disc plates 16, 17, while the hysteresis torque in the negative side being generated when the hub member 11 is relatively rotated in the negative side with respect to the disc plates 16, 17, so that only the friction materials 27, 28 are merely added to the conventional torsional vibration attenuation apparatus having the friction materials 26a, 26b. This construction makes it possible to produce the torsional vibration attenuation apparatus simple in construction, thereby making it possible to make the positive side hysteresis torque larger than the negative side hysteresis torque.

Although the previously mentioned embodiment is constructed to have the friction material 27 provided in the range in which the hub member 11 is relatively rotated in the positive side to a predetermined angle with respect to the disc plate 16, the friction material 27 may be provided in the whole range in which the disc plate 16 is relatively rotated with respect to the hub member 11 according to the present invention.

According to the present invention, the friction material 27 may be extended to an area large in the torsion angle of the disc plate 16, 17 and the hub member 11. More specifically, the circumferential length of the friction material 27 may be lengthened to have the friction material 28 always frictionally contacted with the friction material 27 when the torsion angle between the disc plates 16, 17 and the hub member 11 is more than 15 degrees. In this case, the hysteresis torque may be increased when the torsion angle between the disc plate 16, 17 and the hub member 11 is at a maximum level at the acceleration time of the vehicle.

Second Embodiment

FIGS. 12 to 16 are views showing a second embodiment of the torsional vibration attenuation apparatus according to the present invention. The explanation of the second embodiment of the torsional vibration attenuation apparatus will be omitted hereinafter with the constitutional elements and parts the same as those of the first embodiment of the torsional vibration attenuation apparatus bearing the same reference numerals of the first embodiment of the torsional vibration attenuation apparatus.

Figure 12:
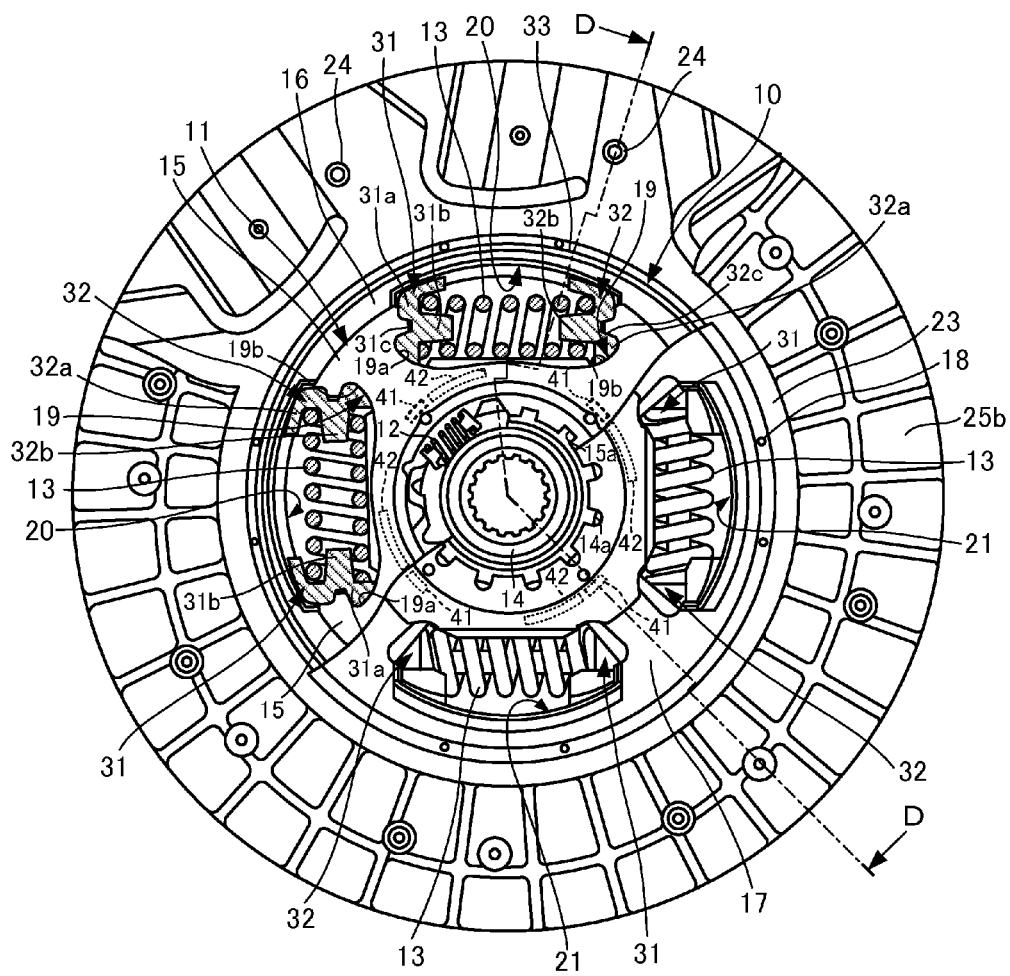
FIG. 12 is a view showing a second embodiment of a torsional vibration attenuation apparatus according to the present invention, and a front view of the torsional vibration attenuation apparatus.
Figure 13:
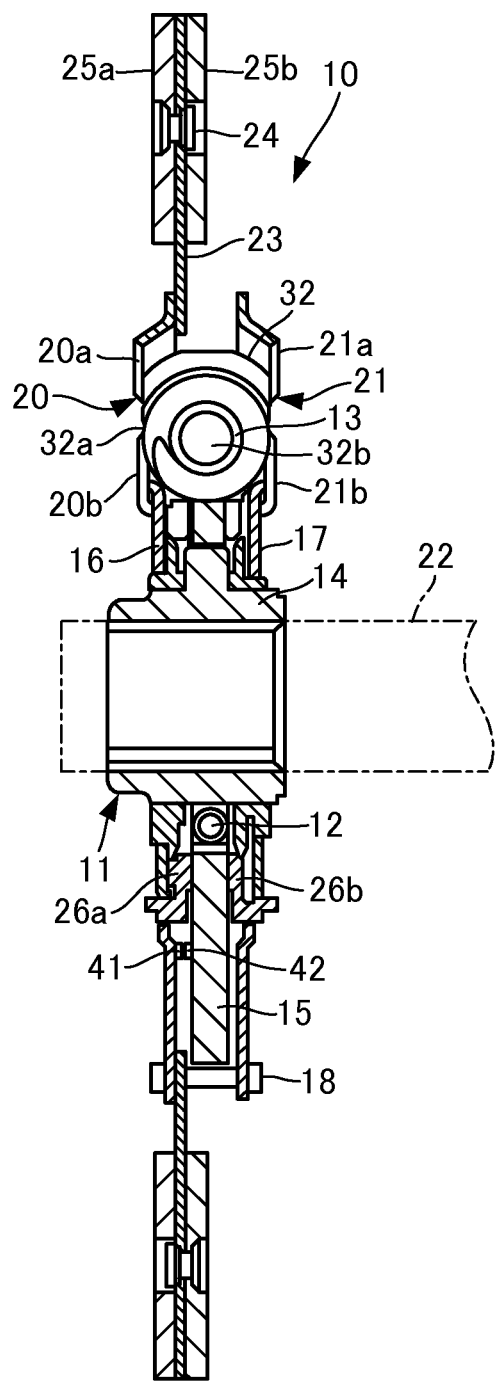
FIG. 13 is a cross-sectional view taken along the chain line and seen from the arrows D-D in FIG. 12.
Figure 14:
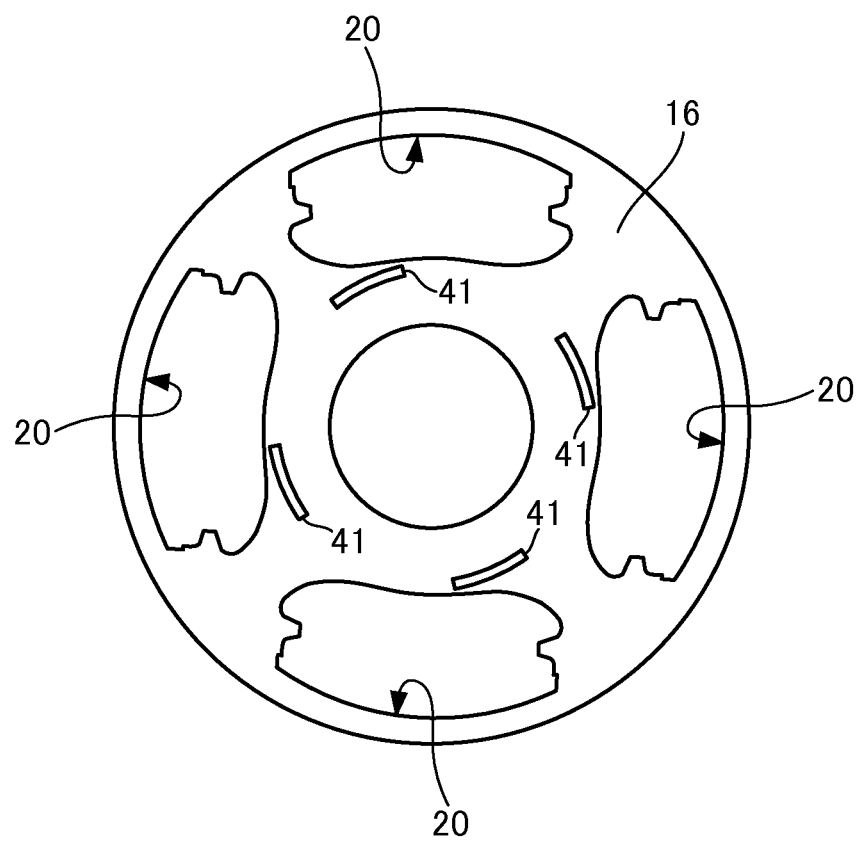
FIG. 14 is a front view of one of the disc plates forming parts of the second embodiment of the torsional vibration attenuation apparatus according to the present invention.

In FIGS. 12 to 14, the disc plate 16 is shown as being provided with a friction material 41 constituting the first friction material and extending a predetermined length in the circumferential direction of the first rotation member. The flange 15 of the hub member 11 is provided with a friction material 42 constituting the second friction material. The friction material 42 is disposed to face the friction material 41 in the axial direction of the hub member 11, and to be frictionally contactable with the friction material 41 when the hub member 11 is relatively rotated in the positive side with respect to the disc plates 16, 17.

The friction materials 41, 42 are provided on the surfaces of the flange 15 and the disc plate 16 axially facing with each other, and thus respectively constitute friction contact materials as defined in the present invention. The friction materials 41, 42 and the friction materials 26a, 26b constitute as whole a hysteresis mechanism as defined in the present invention.

The friction material 41 is provided on the guide plate 33 in such a manner that the friction material 41 is contactable in its circumferential whole surface area with the friction material 42 with the circumferentially central portion of the friction material 41 being positioned on the same radial line with the circumferentially central portion of the friction material 42 when the hub member 11 is twisted in the positive side from its neutral position (torsion angle of zero degree) by a predetermined angle (for example about 15 degrees) with respect to the disc plates 16, 17.

This means that the friction materials 41, 42 are frictionally contacted to increase the positive side hysteresis torque value when the hub member 11 is twisted in the positive side by the predetermined angle with respect to the disc plates 16, 17.

It will therefore be understood that the friction materials 41, 42 are provided in the range in which the hub member 11 is relatively rotated in the positive side by the predetermined angel with respect to the disc plates 16, 17.

The friction materials 41, 42 have respective friction coefficients, thicknesses and the like appropriately set for designing the torsional vibration attenuation apparatus of this kind, so that the sliding resistance, i.e., the hysteresis torque of the friction materials 41, 42 frictionally contacted with each other can be made larger than the hysteresis torque of the hub member 11 and the disc plates 16, 17 frictionally contacted with each other through the friction materials 26a, 26b.

The present embodiment is constructed to generate the hysteresis torques when the hub member 11 is twisted in the positive side and the negative side with respect to the disc plates 16, 17 through the friction materials 26a, 26b, the hysteresis torques being identical to each other, so that the hysteresis torque generated when the hub member 11 is twisted in the positive side to have the friction materials 41, 42 frictionally contacted with each other can be made larger than the hysteresis torque generated when the hub member 11 is twisted in the negative side.

Next, the operation of the second embodiment of the torsional vibration attenuation apparatus according to the present invention will be explained hereinafter.

The actions of the disc plates 16, 17 and the hub member 11 at the acceleration time of the vehicle will be explained with reference to FIG. 15. The disc plate 16 is not shown in FIG. 15, but is moved in parallel with the disc plate 17, so that the action of the disc plate 16 is the same as that of the disc plate 17. The friction material 42 is shown in diagonal lines, i.e., hatching in FIG. 15 for expediting understanding thereof.

Figure 15:
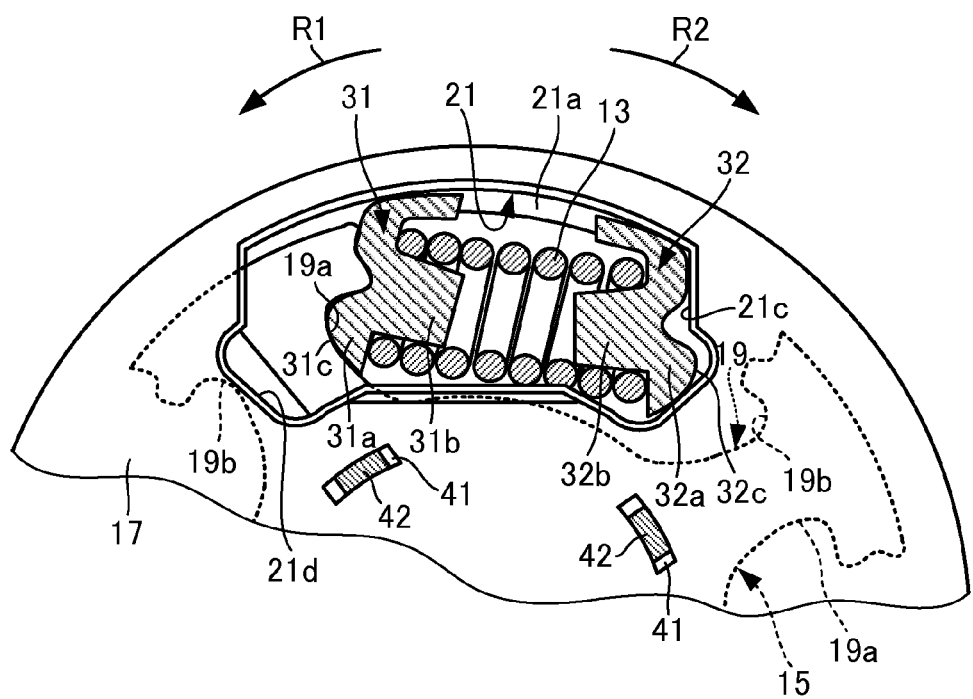
FIG. 15 is a view showing the second embodiment of the torsional vibration attenuation apparatus according to the present invention, and showing the partial operation of the torsional vibration attenuation apparatus at the acceleration time.

When the hub member 11 is twisted in the R2 direction (positive side) with respect to the disc plates 16, 17 at the acceleration time of the vehicle in FIG. 15, the disc plates 16, 17 and the hub member 11 are frictionally contacted with each other through the friction materials 26a, 26b in the small rotational angle area of the disc plates 16, 17 and the hub member 11. At this time, the hysteresis torque of the disc plates 16, 17 and the hub member 11 comes to be small due to the small sliding resistance of the disc plates 16, 17 and the hub member 11.

When the hub member 11 is further twisted in the R2 direction (positive side) with respect to the disc plates 16, 17 to have the torsion angle of the disc plates 16, 17 and the hub member 11 further increased, the friction material 42 of the flange 15 is brought into friction contact with the friction material 41 of the disc plate 16, so that the sliding resistance of the disc plates 16, 17 and the hub member 11 is increased, thereby increasing the hysteresis torque of the hub member 11 and the disc plates 16, 17, as denoted by "T" in FIG. 9.

When the hub member 11 is still further twisted in the R2 direction (positive side) with respect to the disc plates 16, 17 to have the torsion angle of the disc plates 16, 17 and the hub member 11 still further increased, the friction material 42 of the flange 15 is moved to the downstream side of the friction material 41, thereby having the friction materials brought out of friction contact with each other, so that the sliding resistance of the disc plates 16, 17 and the hub member 11 is decreased, thereby decreasing the hysteresis torque of the hub member 11 and the disc plates 16, 17.

As will be understood from the foregoing description, the coil spring 13 is compressed in response to the twisting action of the disc plates 16, 17 and the hub member 11 in the positive side, so that the rotation fluctuation of the internal combustion engine can be absorbed between the disc plates 16, 17 and the hub member 11 while generating the hysteresis torque varied in response to the torsion angle of the hub member 11 and the disc plates 16, 17, thereby making it possible to transmit the rotational torque of the internal combustion engine to the input shaft 22 of the transmission.

When, on the other hand, the rotational torque of the internal combustion engine is decreased to a certain rotational torque level at the deceleration time of the vehicle to have the engine brake generated, the rotational torque is inputted to the hub member 11 from the input shaft 22 of the transmission.

When the rotational fluctuation of the internal combustion engine is increased to a certain rotational fluctuation level at the deceleration time of the vehicle, the torsion angle of the disc plates 16, 17 and the hub member 11 is increased to have the hub member 11 twisted in the 1 direction (negative side) with respect to the disc plates 16, 17, thereby having the coil spring 13 compressed to transmit the rotational torque to the disc plates 16, 17 from the hub member 11.

When the torsion angle of the disc plates 16, 17 and the hub member 11 is increased to a certain torsion angle level, the hub member 11 is rotated in the R1 direction. In response to the rotation of the hub member 11 in the R1 direction, the hub member 11 is twisted in the R1 direction (negative side) with respect to the disc plates 16, 17.

The actions of the disc plates 16, 17 and the hub member 11 performed at this time will be explained with reference to FIG. 16. Here, the disc plate 16 is not illustrated in FIGS. 16, but the disc plate 16 is moved in the same action with the disc plate 17 since the disc plate 16 is moved in parallel with the disc plate 17. The friction material 42 is shown in diagonal lines, i.e., hatching in FIG. 16 for expediting understanding thereof.

Figure 16:
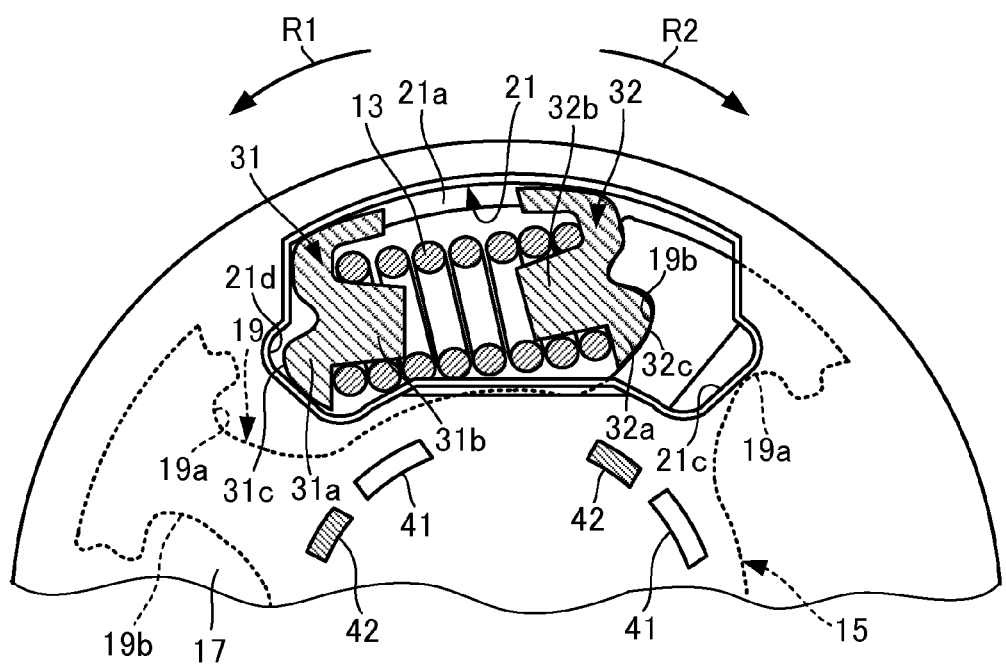
FIG. 16 is a view showing the second embodiment of the torsional vibration attenuation apparatus according to the present invention, and showing the partial operation of the torsional vibration attenuation apparatus at the deceleration time.

In the small torsion angle area of the disc plates 16, 17 and the hub member 11 in FIG. 16, the disc plates 16, 17 and the hub member 11 are frictionally contacted with each other through the friction materials 26a, 26b. At this time, the sliding resistance of the disc plates 16, 17 and the hub member 11 become smaller than the sliding resistance when the disc plates 16, 17 and the hub member 11 are twisted in the positive side, resulting from the fact that the friction materials 41, 42 are out of friction contact with each other, thereby leading to the hysteresis torque of the hub member 11 and the disc plates 16, 17 having a torque value smaller than that of the hysteresis torque generated when the disc plates 16, 17 and the hub member 11 are twisted in the positive side.

As will be understood from the foregoing description, the coil spring 13 is compressed in response to the twisting actions of the disc plates 16, 17 and the hub member 11 in the positive side, so that the rotation fluctuation of the internal combustion engine can be absorbed between the disc plates 16, 17 and the hub member 11.

From the foregoing description, it will be appreciated that the torsional vibration attenuation apparatus according to the present embodiment is constructed to have friction materials 41, 42 provided on the axially facing faces of the disc plate 16 and the hub member 11 to be brought into face-to-face relationship with each other when the hub member 11 is twisted in the positive side by the predetermined angle with respect to the disc plates 16, 17, so that the hysteresis torque generated when the hub member 11 is twisted in the positive side by the predetermined angle with respect to the disc plates 16, 17 can be made larger than the hysteresis torque generated when the hub member 11 is twisted in the negative side by the predetermined angle with respect to the disc plates 16, 17.

For this reason, as shown in FIG. 10, the friction material 41 is moved to the circumferentially downstream side of the friction material 42 to have the friction materials 41, 42 brought out of contact with each other when the torsion angle of the hub member 11 and the disc plates 16, 17 is increased in the low speed rotation area of the internal combustion engine in which the rotational fluctuation is at a relatively large level (for example below 1800 rpm).

At this time, the disc plates 16, 17 and the hub member 11 are frictionally contacted with each other through the friction materials 26a, 26b, so that the hysteresis torque of the hub member 11 and the disc plates 16, 17 comes to be a small torque value, thereby making it possible to effectively attenuate the large torsional vibrations and to suppress the chinking noises from being generated.

When the rotational speed of the internal combustion engine is further increased, the rotational speed of the internal combustion engine passes the rotational speed corresponding to the torsional resonance point (for example around 2500 rpm for a FF vehicle). In the conventional apparatus, the torsional vibrations are increased by the torsional resonance of the drive train as shown by the dashed line in FIG. 11 around the resonance point when the rotational speed of the internal combustion engine passes the torsional resonance point. In contrast, the torsional vibration attenuation apparatus according to the present embodiment is constructed to have the frictional materials 41, 42 frictionally contacted with each other when the hub member 11 is twisted with respect to the disc plates 16, 17 in the rotational speed area in which the torsional resonance is generated, thereby increasing the hysteresis torque of the hub member 11 and the disc plates 16, 17. For this reason, the torsional resonance can be suppressed, so that the muffled noises can be suppressed from being generated as well as the chinking noises can also be suppressed from being generated.

This means that the friction material 42 forming part of the torsional vibration attenuation apparatus according to the present embodiment is provided in the torsion angle area of the hub member 11 and the disc plates 16, 17 to be frictionally contactable with the friction material 41 in the rotation area of the internal combustion engine in which the torsional resonance is generated.

When the rotational speed of the internal combustion engine is further increased, the rotational fluctuation of the internal combustion engine is decreased. At this time, the torsion angle of the hub member 11 and the disc plates 16, 17 is decreased to have the friction material 42 positioned at the upstream side of the friction material 41 in the rotation direction, so that the friction materials 41, 42 are brought out of contact with each other.

At this time, the hub member 11 and the disc plates 16, 17 are frictionally contacted with each other through the friction materials 26a, 26b, so that the hysteresis torque of the hub member 11 and the disc plates 16, 17 comes to be a small torque value, thereby making it possible to effectively attenuate the small torsional vibrations.

When, on the other hand, the hub member 11 is twisted in the negative side with respect to the disc plates 16, 17 at the deceleration time of the vehicle, the friction materials 41, 42 are not provided on the radially facing surfaces of the hub member 11 and the disc plate 16, thereby leading to having the hub member 11 and the disc plates 16, 17 frictionally contacted with each other through the friction materials 26a, 26b.

The sliding resistance of the hub member 11 and the disc plates 16, 17 caused at this time is small as compared with the sliding resistance of the hub member 11 and the disc plates 16, 17 caused when the friction materials 41, 42 are frictionally contacted with each other, thereby making it possible to reduce the hysteresis torque.

For this reason, the torsional vibrations can be attenuated in the high rotation area of the internal combustion engine with the large rotational fluctuation of the internal combustion engine at the deceleration time of the vehicle, thereby making it possible to suppress the chinking noises from being generated.

As will be appreciated from the previous description, the torsional vibration attenuation apparatus 10 according to the present embodiment is simple in construction only with the friction materials 41, 42 and the guide plate 33, the friction materials 41, 42 being frictionally contactable with each other when the hub member 11 is relatively rotated in the positive side with respect to the disc plates 16, 17, thereby making it possible to make the hysteresis torque variable in the positive side (at the acceleration time) and the negative side (at the deceleration time), so that the production workability of the work for the torsional vibration attenuation apparatus 10 can be improved, and the production cost of the torsional vibration attenuation apparatus 10 can be prevented from being increased.

In particular, the friction contact members in the present embodiment are constituted by the friction material 41 provided on the disc plate 16 to extend a predetermined length in the circumferential direction of the disc plate 16, and the friction material 42 provided on the facing surface of the flange 15 of the hub member 11 axially facing the disc plate 16, the friction material 42 being frictionally contactable with the friction material 41 when the hub member 11 is twisted in the positive side with respect to the disc plate 16.

For this reason, the torsional vibration attenuation apparatus according to the present embodiment can be made simple in construction only with the friction materials 41, 42 respectively provided on the hub ember 11 and the disc plate 16, thereby making it possible to make the hysteresis torque in the positive side larger than the hysteresis torque in the negative side.

In addition, the friction materials 41, 42 are provided in the range in which the hub member 11 is relatively rotated by the predetermined angle in the positive side with respect to the disc plates 16, 17, thereby making it possible to increase the hysteresis torque when the torsion angle of the disc plates 16, 17 and the hub member 11 reaches a torsion angle corresponding to the torsional resonance of the rotational speed of the internal combustion engine.

As a result, the torsional vibration attenuation apparatus according to the present embodiment can reduce the hysteresis torque to sufficiently attenuate the small torsional vibrations in the rotation area of the internal combustion engine with the reduced rotation fluctuation of the internal combustion engine, and can increase the hysteresis torque in the rotation area of the internal combustion engine in which the torsional resonance is generated, thereby making it possible to suppress the chinking noises and the muffled noises caused by the torsional resonance.

Further, the magnitude of the hysteresis torque generated when the hub member 11 is relatively rotated in the positive side with respect to the disc plates 16, 17 can freely be set in response to the torsion angle of the disc plates 16, 17 and the hub member 11, thereby making it possible to improve the degree of freedom for setting the hysteresis torque.

The torsional vibration attenuation apparatuses according to present embodiment further comprises friction materials 26a, 26b provided to extend in the circumferential direction of the disc plate 16 and the hub member 11 for frictionally contacting the disc plate 16 and the hub member 11 with each other, thereby making it possible to generate the hysteresis torques the same in magnitude in the positive side and the negative side.

In addition, the torsional vibration attenuation apparatuses according to present embodiment is constructed to set the friction resistance values of the friction materials 41, 42 to allow the hysteresis torque in the positive side to be larger than the hysteresis torque in the negative side, the hysteresis torque in the positive side being generated when the hub member 11 is relatively rotated in the positive side with respect to the disc plates 16, 17, while the hysteresis torque in the negative side being generated when the hub member 11 is relatively rotated in the negative side with respect to the disc plates 16, 17, so that only the friction materials 41, 42 are merely added to the conventional torsional vibration attenuation apparatus having the friction materials 26a, 26b. This construction makes it possible to produce the torsional vibration attenuation apparatus simple in construction, thereby making it possible to allow the positive side hysteresis torque to be larger than the negative side hysteresis torque.

Although the torsional vibration attenuation apparatuses according to the present embodiment is constructed to have the friction material 41 provided in the range in which the hub member 11 is relatively rotated in the positive side by a predetermined angle with respect to the disc plate 16, the friction material 41 may be provided in the whole range in which the disc plate 16 is relatively rotated with respect to the hub member 11 according to the present invention.

According to the present invention, the friction material 41 may be extended to an area large in the torsion angle of the disc plate 16, 17 and the hub member 11. More specifically, the circumferential length of the friction material 41 may be lengthened to have the friction material 42 always frictionally contacted with the friction material 41 when the torsion angle between the disc plates 16, 17 and the hub member 11 is more than 15 degrees. In this case, the hysteresis torque may be increased when the torsion angle between the disc plate 16, 17 and the hub member 11 is at a maximum level in an acceleration time of a vehicle.

The torsional vibration attenuation apparatuses 10 according to the previously mentioned embodiments have been explained, each raising an example provided between the internal combustion engine and the drive train, however, may be applied to a torsional vibration attenuation apparatus to be provided in the drive train. For a hybrid vehicle for example, the torsional vibration attenuation apparatuses 10 according to the previously mentioned embodiments may be applied to a torsional vibration attenuation apparatus such as a damper and the like intervening between the output shaft of the internal combustion engine and a power splitting mechanism for splitting driving power to an electric motor and an wheel side output shaft.

Further, the torsional vibration attenuation apparatus according to the present invention may be applied to a lockup damper intervening between a lockup clutch apparatus forming part of a torque converter and a set of transmission gears. The torsional vibration attenuation apparatus according to the present invention may be disposed between a differential case and a ring gear provided at an outer peripheral portion of a differential case.

Each of the previously mentioned embodiments of the torsional vibration attenuation apparatus according to the present invention is constructed to have a small spring 12 between the outer peripheral portion of the boss 14 and the inner peripheral portion of the flange 15 radially separated from each other, however, the boss 14 may be integrally formed with the flange 15 with no spring like the spring 12 disposed between the boss 14 and the flange 15 according to the present invention.

Each of the previously mentioned embodiments of the torsional vibration attenuation apparatus according to the present invention is constructed to have the friction materials 26a, 26b constituting the hysteresis mechanism between the hub member 11 and the disc plates 16, 17, however, the friction materials 26a, 26b may be omitted according to the present invention.

The previously disclosed embodiments are exemplary in all aspects, however, the present invention is not limited to these embodiments. The scope defined in claims as the present invention should be construed to include equivalents and modifications within the spirit of the present invention.

From the foregoing description, it will be understood that the torsional vibration attenuation apparatus according to the present invention is of such an advantageous effect that the torsional vibration attenuation apparatus can be made simple in construction, and can have the hysteresis torques varied in the positive side and the negative side by the simple construction, and can improve the workability of the production work, and can prevent the production cost from being increased. The torsional vibration attenuation apparatus according to the present invention can be useful as a torsional vibration attenuation apparatus and the like which is disposed between the internal combustion engine and the drive train of the vehicle to have the first rotation member and the second rotation member relatively rotatably connected with each other through a resilient member to transmit the rotational torque between the first rotation member and the second rotation member.

EXPLANATION OF REFERENCE NUMERALS

10: torsional vibration attenuation apparatus
11: hub member (second rotation member)
13: coil spring (resilient member)
14: boss
15: flange
16, 17: disc plate (first rotation member)
22: input shaft
26a, 26b: friction material (hysteresis torque generation member, hysteresis mechanism)
27, 41: friction material (first friction material, friction contact member, hysteresis mechanism)

28, 42: friction material (second friction material, friction contact member, hysteresis mechanism)

33: guide plate (guide member, friction contact member, hysteresis mechanism)

The invention claimed is:

1. A torsional vibration attenuation apparatus, comprising:
a first rotation member;
a second rotation member provided to be relatively rotatable with respect to the first rotation member;
a resilient member provided between the first rotation member and the second rotation member and resiliently deformable between the first rotation member and the second rotation member in response to a relative rotation of the second rotation member with respect to the first rotation member in a positive side and a negative side; and
a hysteresis mechanism having the first rotation member and the second rotation member frictionally contacted with each other,
the hysteresis mechanism including hysteresis torque generation members and friction contact members, the hysteresis torque generation members being provided to extend in the circumferential direction of the first rotation member and the second rotation member to be frictionally contactable with the first rotation member and the second rotation member to generate the hysteresis torques when the second rotation member is twisted in the positive side and the negative side with respect to the first rotation member, the hysteresis torque generated when the second rotation member is twisted in the positive side being identical to the hysteresis torque generated when the second rotation member is twisted in the negative side, the friction contact members being respectively constituted by a first friction material provided on the first rotation member and a second friction material provided on the second rotation member,
the first rotation member and the second rotation member respectively having facing surfaces facing each other and provided thereon with the first friction material and the second friction material respectively to have the first friction material and the second friction material frictionally contacted with each other, so that there is generated a sliding resistance between the first friction material and the second friction material in response to the relative rotation of the second rotation member with respect to the first rotation member in the positive side, the first friction material and the second friction material being spaced apart from each other in the rotation direction of the first rotation member in response to the relative rotation of the second rotation member with respect to the first rotation member in the negative side;
in which each of the first friction material and the second friction material is set to have a contact resistance with the hysteresis torque generated in response to the relative rotation of the first rotation member in the positive side with respect to the second rotation member being larger than the hysteresis torque generated in response to the relative rotation of the second rotation member with respect to the first rotation member in the negative side.

2. The torsional vibration attenuation apparatus as set forth in claim 1, in which the first friction material and the second friction material are provided within an angular range in which the second rotation member is relatively rotatable by a predetermined angle in the positive side with respect to the first rotation member.

3. The torsional vibration attenuation apparatus as set forth in claim 1, in which the first friction material and the second friction material are provided on the facing surfaces of the first rotation member and the second rotation member, the facing surfaces radially facing each other.

4. The torsional vibration attenuation apparatus as set forth in claim 3, in which the friction contact members are constructed to include a guide member provided on the first rotation member to have a curved surface identical in shape to the rotation path of the radially outer end of the second rotation member and to extend in the circumferential direction of the first rotation member, the first friction material being provided on the guide member, the second friction material being provided on the second rotation member to be positioned radially inwardly of the guide member to be frictionally contactable with the first friction material in response to the relative rotation of the second rotation member with respect to the first rotation member in the positive side.

5. The torsional vibration attenuation apparatus as set forth in claim 1, in which the first friction material and the second friction material are provided on the facing surfaces of the first rotation member and the second rotation member, the facing surfaces axially facing each other.

6. The torsional vibration attenuation apparatus as set forth in claim 5, in which the first friction material is provided on the first rotation member to extend by a predetermined length in a circumferential direction of the first rotation member.

7. The torsional vibration attenuation apparatus as set forth in claim 1, which is to be mounted on a vehicle, and in which the first rotation member is transmitted with a rotational torque from an internal combustion engine, and the second rotation member is mounted on the vehicle to output the rotational torque to a drive train, the second rotation member being twisted in the positive side with respect to the first rotation member at an acceleration time of the vehicle, while the second rotation member being twisted in the negative side with respect to the first rotation member at a deceleration time of the vehicle.

8. The torsional vibration attenuation apparatus as set forth in claim 1, in which
the second rotation member is constituted to include a hub member having a boss connected with an input shaft forming part of a drive train, and a flange radially outwardly projecting from the boss,
the first rotation member is constituted to include disc plates provided at both axial sides of the hub member to be transmitted with a power from an internal combustion engine, and
the friction contact members are provided on the facing surfaces of the flange and the disc plates to be frictionally contactable with each other in response to the relative rotation of the hub member in the positive side with respect to the disc plates.

9. A torsional vibration attenuation apparatus, comprising:
a first rotation member;
a second rotation member provided to be relatively rotatable with respect to the first rotation member;
a resilient member provided between the first rotation member and the second rotation member and resiliently deformable between the first rotation member and the second rotation member in response to a relative rotation of the second rotation member with respect to the first rotation member in a positive side and a negative side; and
a hysteresis mechanism having the first rotation member and the second rotation member frictionally contacted with each other,
the hysteresis mechanism including hysteresis torque generation members and friction contact members, the hysteresis torque generation members being provided to extend in the circumferential direction of the first rotation member and the second rotation member to be frictionally contactable with the first rotation member and the second rotation member to generate the hysteresis torques when the second rotation member is twisted in the positive side and the negative side with respect to the first rotation member, the hysteresis torque generated when the second rotation member is twisted in the positive side being identical to the hysteresis torque generated when the second rotation member is twisted in the negative side, the friction contact members being respectively constituted by a first friction material provided on the first rotation member and a second friction material provided on the second rotation member, the first rotation member and the second rotation member respectively having facing surfaces facing each other and provided thereon with the first friction material and the second friction material respectively to have the first friction material and the second friction material frictionally contacted with each other, so that there is generated a sliding resistance between the first friction material and the second friction material in response to the relative rotation of the second rotation member with respect to the first rotation member in the positive side, the first friction material and the second friction material being spaced apart from each other in the rotation direction of the first rotation member in response to the relative rotation of the second rotation member with respect to the first rotation member in the negative side;

in which the first friction material and the second friction material are provided on the facing surfaces of the first rotation member and the second rotation member, the facing surfaces radially facing each other.

10. A torsional vibration attenuation apparatus, comprising:
a first rotation member;
a second rotation member provided to be relatively rotatable with respect to the first rotation member;
a resilient member provided between the first rotation member and the second rotation member and resiliently deformable between the first rotation member and the second rotation member in response to a relative rotation of the second rotation member with respect to the first rotation member in a positive side and a negative side; and
a hysteresis mechanism having the first rotation member and the second rotation member frictionally contacted with each other, the hysteresis mechanism including hysteresis torque generation members and friction contact members, the hysteresis torque generation members being provided to extend in the circumferential direction of the first rotation member and the second rotation member to be frictionally contactable with the first rotation member and the second rotation member to generate the hysteresis torques when the second rotation member is twisted in the positive side and the negative side with respect to the first rotation member, the hysteresis torque generated when the second rotation member is twisted in the positive side being identical to the hysteresis torque generated when the second rotation member is twisted in the negative side, the friction contact members being respectively constituted by a first friction material provided on the first rotation member and a second friction material provided on the second rotation member, the first rotation member and the second rotation member respectively having facing surfaces facing each other and provided thereon with the first friction material and the second friction material respectively to have the first friction material and the second friction material frictionally contacted with each other, so that there is generated a sliding resistance between the first friction material and the second friction material in response to the relative rotation of the second rotation member with respect to the first rotation member in the positive side, the first friction material and the second friction material being spaced apart from each other in the rotation direction of the first rotation member in response to the relative rotation of the second rotation member with respect to the first rotation member in the negative side;

in which the friction contact members are constructed to include a guide member provided on the first rotation member to have a curved surface identical in shape to the rotation path of the radially outer end of the second rotation member and to extend in the circumferential direction of the first rotation member, the first friction material being provided on the guide member, the second friction material being provided on the second rotation member to be positioned radially inwardly of the guide member to be frictionally contactable with the first friction material in response to the relative rotation of the second rotation member with respect to the first rotation member in the positive side.

* * * * *